US007619036B2

(12) United States Patent
Mays et al.

(10) Patent No.: US 7,619,036 B2
(45) Date of Patent: Nov. 17, 2009

(54) COPOLYMERS OF FLUORINATED POLYDIENES AND SULFONATED POLYSTYRENE

(75) Inventors: Jimmy W. Mays, Knoxville, TN (US);
Samuel P. Gido, Hadley, MA (US);
Tianzi Huang, Knoxville, TN (US);
Kunlun Hong, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 247 days.

(21) Appl. No.: 11/085,619

(22) Filed: Mar. 21, 2005

(65) Prior Publication Data

US 2006/0014902 A1 Jan. 19, 2006

Related U.S. Application Data

(60) Provisional application No. 60/554,461, filed on Mar. 19, 2004.

(51) Int. Cl.
*C08F 8/18* (2006.01)
*C08F 8/36* (2006.01)

(52) U.S. Cl. .................. 525/64; 525/98; 525/332.3; 525/332.4

(58) Field of Classification Search .............. 525/332.3, 525/332.4, 64, 98
See application file for complete search history.

(56) References Cited

U.S. PATENT DOCUMENTS

| 4,522,952 | A | * | 6/1985 | Klein et al. | .................... | 521/31 |
| 4,828,585 | A | * | 5/1989 | Chiao | ............................. | 95/47 |
| 5,220,087 | A | * | 6/1993 | Berenbaum et al. | ......... | 585/462 |
| 6,225,368 | B1 | * | 5/2001 | D'Agostino et al. | .......... | 522/79 |
| 2007/0287805 | A1 | * | 12/2007 | Hacker | ....................... | 525/285 |

FOREIGN PATENT DOCUMENTS

| WO | WO 02/31002 | 4/2002 |
| WO | WO 02/079269 | 10/2002 |

OTHER PUBLICATIONS

Alward et al., "Effect of Arm Number and Arm Molecular Weight on the Solid-State Morphology of Poly(styrene-isoprene) Star Block Copolymers," Macromolecules, vol. 19, p. 215 (1986).
Antonucci et al., "Investigation of a direct methanol fuel cell based on a composite Nafion®-silica electrolyte for high temperature operation," Solid State Ionics, vol. 125, pp. 431-437 (1999).
Belloni et al., "Counterion distribution in urchinlike charged copolymer micelles Monte Carlo simulation and small angle x-ray scattering," Chem. Phys., vol. 119, p. 7560 (2003).
Beyer et al., "Graft Copolymers with Regularly Spaced, Tetrafunctional Branch Points: Morphology and Grain Structure," Macromolecules, vol. 33, p. 2039 (2000).
Beyer et al., "Morphological Behavior of $A_2B_2$ Star Block Copolymers," J. Polymer Sci.: Part B, Polymer Physics, 37, 3392 (1999).
Beyer et al., "Morphology of Vergina Star 16-Arm Block Copolymers and Scaling Behavior of Interfacial Area with Graft Point Functionality," Macromolecules, 30, 2373 (1997).
Beyer et al., "Morphological Behavior of $A_5B$ Miktoarm Star Block Copolymers," Macromolecules 32, 6604 (1999).
Burgaz et al., "T-Junction Grain Boundaries in Block Copolymer-Homopolymer Blends," Macromolecules, 33, 8739-8745 (2000).
Chang et al., "Analysis of Grain Structure in Partially Ordered Block Copolymers by Depolarized Light Scattering and Transmission Electron Microscopy," Macromolecules, 35, 4437 (2002).
Csernica et al., "Gas Permeability of a Polystyrene-Polybutadiene Block Copolymer with Oriented Lamellar Domains," Macromolecules, vol. 20, p. 2468 (1987).
Csernica et al., "Gas Permeability of a Polystyrene/Polybutadiene Block Copolymer Possessing a Misoriented Lamellar Morphology," Macromolecules, 22, 1493 (1989).
Deng et al., "Novel Nafion/ORMOSIL Hybrids via in Situ Sol-Gel Reactions. 1. Probe of ORMOSIL Phase Nanostructures by Infrared Spectroscopy," Chem. Mater., vol. 7, p. 2259 (1995).
Deng et al., "Small-Angle X-Ray Scattering Studies of Nafion®/[Silicon Oxide] and Nafion®/ORMOSIL Nanocomposites," J. Polymer Sci. B: Polymer Phys., vol. 34, pp. 1917-1923 (1996).
Deng et al., "Novel Nafion®/ORMOSIL Hybrids via in situ Sol-Gel Reactions: 2. Probe of ORMOSIL Phase Nanostructure by $^{29}$Si Solid State NMR Spectroscopy," J. Sol-Gel Sci. & Technol. vol. 7, p. 177 (1996).
Doyle et al., "High-Temperature Proton Conducting Membranes Based on Perfluorinated Ionomer Membrane-Ionic Liquid Composites," J. Electrochem. Soc., vol. 147, pp. 34-37 (2001).
Gido et al., "Lamellar Diblock Copolymer Grain Boundary Morphology. 3. Helicoid Section Twist Boundary Energy," Macromolecules, vol. 30, p. 3739 (1997).
Gido et al., "Lamellar Diblock Copolymer Grain Boundary Morphology. 1. Twist Boundary Characterization," Macromolecules, vol. 26, p. 4506 (1993).
Gido et al., "Synthesis, Characterization, and Morphology of Model Graft Copolymers with Trifunctional Branch Points," Macromolecules, vol. 29, p. 7022 (1996).
Gido et al., "Interfacial Curvature in Graft and Diblock Copolymers and Implications for Long-Range Order in Cylindrical Morphologies," Macromolecules, vol. 30, p. 6771 (1997).
Hadjichristidis et al., "Conformation of Poly(isoprene-g-Styrene) in Dilute Solution," J. Polymer Sci., Polym. Phys. Ed., vol. 16, p. 851 (1978).
Hadjichristidis et al., "Anionic Polymerization: High Vacuum Techniques," J. Polym. Sci., Polym. Chem. Ed., Vol. 38, p. 3211 (2000).
Heitner-Wirguin, C., "Recent advances in perfluorinated ionomer membranes: structure, properties and applications," J. Membrane Sci., vol. 120, pp. 1-33 (1996).

(Continued)

*Primary Examiner*—Jeffrey C Mullis
(74) *Attorney, Agent, or Firm*—Jenkins, Wilson, Taylor & Hunt, P.A.

(57) ABSTRACT

Copolymers of fluorinated polydienes and sulfonated polystyrene and their use in fuel cell membranes, batteries, breathable chemical-biological protective materials, and templates for sol-gel polymerization.

32 Claims, 15 Drawing Sheets

OTHER PUBLICATIONS

Hong, K. et al., "1,3-Cyclohexadiene Polymers. 3. Synthesis and Characterization of Poly(1,3-cyclohexadiene-block-styrene," Macromolecules, vol. 34, p. 3540 (2001).

Hong, K. et al., "1,3-Cyclohexadiene Polymers. 1. Anionic Polymerization," Macromolecules, vol. 34, p. 782 (2001).

Hong et al., "1,3-Cyclohexadiene Polymers. 2. Near-Monodisperse Star and Star-Block Polymers Based on Poly(1,3-cyclohexadiene)," Macromolecules, vol. 34, p. 2482 (2001).

Hong et al., "Sulfonation of 1,3-Cyclohexadiene Polymers," Presented at the $226_{th}$ ACS National Meeting, New York, NY, Sep. 9, 2003.

Iatrou et al., "Regular Comb Polystyrenes and Graft Polyisoprene/Polystyrene Copolymers with Double Branches ("Centipedes"). Quality of (1,3-Phenylene)bis(3-methyl-1-phenylpentylidene)dilithium Initiator in the Presence of Polar Additives," Macromolecules, vol. 31, p. 6697 (1998).

Kinning et al., "Effect of Morphology on the Transport of Gases in Block Copolymers," Macromolecules, vol. 20, p. 1129 (1987).

Lee et al., "H-shaped double graft copolymers: Effect of molecular architecture on morphology," J. Chem. Phys., vol. 107, p. 6460 (1997).

Lee et al., "Asymmetric Single Graft Block Copolymers: Effect of Molecular Architecture on Morphol," Macromolecules, vol. 30, p. 3732 (1997).

Lee et al., "π-Shaped double-graft copolymers: effect of molecular architecture on morphology," Polymer, vol. 19, p. 4631 (1998).

Matsen, M. W., "Kink grain boundaries in a block copolymer lamellar phase," J. Chem. Phys., vol. 107, p. 8110 (1997).

Milner, S. T., "Chain Architecture and Asymmetry in Copolymer Microphases," Macromolecules, vol. 27, p. 2333 (1994).

Mohanty et al., "Reaction and Transport in Disordered Composite Media: Introduction of Percolation Concepts," Chemical Engineering Science, vol. 37, p. 905 (1982).

Nakamura et al., "Radius of Gyration of Polystyrene Combs and Centipedes in Solution," Macromolecules, vol. 33, p. 8323 (2000).

Pochan et al., "Morphologies of Microphase-Separated Conformationally Asymmetric Diblock Copolymers," J. Polymer Sci.: Part B, Polymer Physics, vol. 35, p. 2629 (1997).

Pochan et al., "Morphologies of Microphase-Separated $A_2B$ Simple Graft Copolymers," Macromolecules, vol. 29, p. 5091 (1996).

Rein et al., "$CO_2$ Diffusion and Solubility in a Polystyrene-Polybutadiene Block Copolymer with a Highly Oriented Lamellar Morphology," Macromolecules, vol. 23, p. 4456 (1990).

Ren et al., "A New Class of Fluoronated Polymers by a Mild, Selective, and Quantitative Fluoronation," J. Am. Chem. Soc., vol. 120, p. 6830 (1998).

Ren et al., "A Simple and Mild Route to Highly Fluorinated Model Polymers," Macromolecules, vol. 34, p. 4780 (2001).

Siddiqui et al., "Addition of Difluorocarbene to 1,4-Polybutadienes. Synthesis and Characterization of Novel Copolymers," Macromolecules, vol. 19, p. 595 (1986).

Thomas et al., "Ordered Packing Arrangements of Spherical Micelles of Diblock Copolymers in Two and Three Dimensions," Macromolecules, vol. 20, p. 2934 (1987).

Thomas, B. L., "Ordered Bicontinuous Double-Diamond Structure of Star Block Copolymers: A New Equilibrium Microdomain Morphology," Macromolecules, vol. 19, p. 2197 (1986).

Thomsen, M. W., "Infrared Laser-Induced Reactions of Difluorocarbene with 1,2-Polybutadiene," Macromolecules, vol. 22, p. 481 (1989).

Tsoukatos et al., "Model Linear Block Co-, Ter-, and Quaterpolymers of 1,3-Cyclohexadiene with Styrene, Isoprene, and Butadiene," Macromolecules, vol. 35, pp. 7928-7935 (2002).

Tung et al., "Studies on Dilithium Initiators. 1. Hydrocarbon-Soluble Initiators—1,3-Phenylenebis(3-methyl-1-phenylpentylidene)dilithium and 1,3-Phenylenebis[3-methyl-1-(methylphenyl)pentylidene]dilithium," Macromolecules, vol. 27, p. 2219 (1994).

Uhrig et al., "Synthesis of Combs, Centipedes, and Barbwires: Poly(isoprene-graft-styrene) Regular Multigraft Copolymers with Trifunctional, and Hexafunctional Branch Points," Macromolecules, vol. 35, p. 7182 (2002).

Villain-Guillot et al., "Interfaces and grain boundaries of lamellar phases," Physica A, vol. 249, p. 285 (1998).

Weidisch et al., "Tetrafunctional Multigraft Copolymers as Novel Thermoplastic Elastomers," Macromolecules, vol. 34, p. 6333 (2001).

Winey et al., "Ordered morphologies in binary blends of diblock copolymer and homopolymer and characterization of their intermaterial dividing surfaces," J. Chem. Phys., vol. 95, p. 9367 (1991).

Xenidou et al., "Morphology of Model Graft Copolymers with Randomly Placed Trifunctional and Tetrafunctional Branch Points," Macromolecules, vol. 31, p. 7659 (1998).

* cited by examiner (a) Small Isotropic Lamellar Grain (b) Large Anisotropic Lamellar Grain

COPOLYMERS OF FLUORINATED POLYDIENES AND SULFONATED POLYSTYRENE

CROSS REFERENCE TO RELATED APPLICATIONS

This application is based on and claims priority to U.S. Provisional Patent Application Ser. No. 60/554,461, filed Mar. 19, 2004, which is incorporated herein by reference in its entirety.

GOVERNMENT INTEREST

The work was supported by the U.S. Department of Energy, EERE Program, through Oak Ridge National Laboratory, and by the U.S. Army Research Office. The U.S. government has certain rights in the invention.

TECHNICAL FIELD

Copolymers of fluorinated polydienes and sulfonated polystyrene and their use in electrochemical cell membranes, for example, in fuel cells, as polyelectrolytes in electrochemical cells, such as batteries, fabrics, for example for use in breathable chemical-biological protective materials, and templates for sol-gel polymerization, as representative applications.

| ABBREVIATIONS | |
|---|---|
| BHT = | butylated hydroxy toluene |
| BR = | butyl rubber |
| ° C. = | degrees Celsius |
| CO = | carbon monoxide |
| DABCO = | 1,4-diazabicyclo[2.2.2]octane |
| DDQ = | 2,3-dichloro-5,6-dicyano-1,4-benzoquinone |
| DLI = | difunctional lithium initiator |
| FPB = | fluorinated 1,4-polybutadiene |
| FTIR = | Fourier transform infrared |
| GPC = | gel permeation chromatography |
| HFPO = | hexafluoropropylene oxide |
| IR = | infrared |
| MALDI-TOF-MS = | matrix assisted laser desorption ionization time-of-flight mass spectrometry |
| MALLS = | multiangle laser light scattering |
| Me = | methyl |
| NMR = | nuclear magnetic resonance |
| PαMS = | poly(α-methylstyrene) |
| PBD = | polybutadiene |
| PCHD = | polycyclohexadiene |
| PDI = | polydispersity index |
| PEM = | proton exchange membrane |
| PI = | polyisoprene |
| PS = | polystyrene |
| PSS = | poly(styrene sulfonic acid) |
| SABrE = | self assembling barrier elastomer |
| SAXS = | small angle X-ray scattering |
| SANS = | small angle neutron scattering |
| SEC = | size exclusion chromatography |
| SEM = | scanning electron microscopy |
| TEM = | transmission electron microscope |
| TEP = | triethylphosphate |
| TGA = | thermogravimetric analysis |
| $T_g$ = | glass transition temperature |
| $T_m$ = | melting point |

BACKGROUND

Robust, highly conductive, and inexpensive proton exchange membranes (PEMS) are needed for practical and reliable electrochemical cell, e.g., fuel cell, operation at elevated temperatures. Current fuel cell membranes typically are based on polymeric materials, such as those available under the registered trademark NAFION® from E. I. duPont de Nemours and Co., Wilmington, Del., United States of America. A NAFION® polymer is a perfluorinated polymer comprising low levels of ionic groups, which aggregate to form ionic, hydrophilic clusters. These hydrophilic clusters allow transport of water and ions across membranes formed from NAFION® polymer, making it a useful material for fuel cell membranes, catalysis, and templating.

PEMs based on NAFION® polymers have long been considered benchmarks in terms of performance characteristics. See Heitner-Wirquin, C., *J. Membrane Sci.* 120, 1-33 (1996). Fuel cell membranes based on NAFION® polymer suffer several disadvantages, however. For example, NAFION® polymer is expensive and typically cannot be used in applications requiring temperatures in excess of 100° C. Also, the structure of NAFION® polymer is complex and not fully understood.

Further, the current class of PEM fuel cells, which typically operate at about 90° C., is hampered by sensitivities to carbon monoxide (CO) and peroxide formation that limit performance and require the use of high purity fuels. To overcome such sensitivities to CO, complex systems are required to remove CO from the fuel. Further, platinum catalysts typically are required on the anode to minimize the effect of CO on membrane polarization. A polymeric membrane capable of operating at elevated temperatures (e.g., temperatures above about 150° C.) would largely eliminate such concerns, because CO adsorption is no longer kinetically favorable at those temperatures.

Given the importance of practical operations of fuel cells with high performance, low cost, and extended lifetimes, various approaches to the synthesis and characterization of PEM materials have been reported. Doyle et al., *J. Electrochem. Soc.* 147, 34-37 (2001), have reviewed a number of alternative PEM systems, including polymer systems doped with acids or ionic liquids. Inorganic dopants and hybridization procedures also have been used in an effort to improve mechanical, thermal, and water sorption properties of NAFION®-based PEMs. See Deng. Q., et al., *J. Appl. Polymer Sci.* 68, 747-763 (1998); Antonucci, P. L., et al., *Solid State Ionics* 125, 431-437 (1999).

There exists, however, a need in the art for improved materials for PEMs, in particular PEMs for sustained operation in fuel cells at elevated temperatures (e.g., temperatures above about 150° C.).

Further, there exists a need in the art for improved fabrics, for example for use in breathable chemical and biological protective clothing for military personnel, emergency response teams, industrial and/or agricultural workers and other applications, and healthcare professionals. Standard protective clothing is made largely from butyl rubber (BR), a material whose impermeability provides an excellent level of protection, but also traps heat and moisture inside the garments. BR garments also are bulky and limit dexterity. For example, a particular problem with gloves made from BR materials is that they constrain hand movement. In a desert combat environment these problems could result in more than simple discomfort and inconvenience.

Thus, there is a need in the art for improved materials for use as fuel cell membranes and as a fabric, for example for use in breathable chemical-biological protective clothing.

SUMMARY

In some embodiments, the presently disclosed subject matter provides a method for forming a copolymer comprising a fluorinated polydiene and a sulfonated polystyrene, the method comprising:
(a) providing a copolymer comprising a polydiene component and a polystyrene component;
(b) reacting the polydiene component of the copolymer with a fluorinating agent to form a fluorinated polydiene component; and
(c) reacting the polystyrene component of the copolymer with a sulfonating agent to form a sulfonated polystyrene component;

thereby forming a copolymer comprising a fluorinated polydiene and a sulfonated polystyrene. In some embodiments, the presently disclosed subject matter provides a copolymer comprising a fluorinated polydiene and a sulfonated polystyrene.

In some embodiments, the copolymer comprising a fluorinated polydiene and a sulfonated polystyrene comprises an architecture selected from the group consisting of a diblock copolymer, a triblock copolymer, a statistical copolymer, a graft copolymer, and a miktoarm star copolymer.

In some embodiments, the polydiene component is selected from the group consisting of 1,4-polybutadiene, poly(1,3-cyclohexadiene), and polyisoprene. In some embodiments, the fluorinating agent comprises difluorocarbene. In some embodiments, the polystyrene is selected from the group consisting of polystyrene and poly(α-methylstyrene). In some embodiments, the sulfonating agent is selected from the group consisting of acetyl sulfate and sulfur trioxide.

In some embodiments, the copolymer comprising a fluorinated polydiene and a sulfonated polystyrene comprises an AB block copolymer, wherein the A block comprises a polystyrene and the B block comprises a polydiene. In some embodiments, the copolymer comprising a fluorinated polydiene and a sulfonated polystyrene comprises an ABA triblock copolymer, wherein the A block of the triblock copolymer comprises a polydiene and the B block of the triblock copolymer comprises a polystyrene. In some embodiments, the copolymer comprising a fluorinated polydiene and a sulfonated polystyrene comprises a statistical copolymer comprising 1,3-cyclohexadiene and α-methylstyrene. In some embodiments, the copolymer comprising a fluorinated polydiene and a sulfonated polystyrene comprises a graft copolymer. In some embodiments, the graft copolymer comprises an architecture selected from the group consisting of a trifunctional comb architecture, a tetrafunctional centipede architecture, a hexafunctional barbwire architecture, and a miktoarm star architecture.

In some embodiments, the fluorinated polydiene is present in a greater stoichiometric amount than the sulfonated polystyrene. In some embodiments, the method comprises optimizing an amount of the fluorinated polydiene, an amount of the sulfonated polystyrene, or an amount of both the fluorinated polydiene and the sulfonated polystyrene to provide a copolymer having a predetermined characteristic. In some embodiments, the predetermined characteristic is selected from the group consisting of hydrophilicity, permeability to water, thermal stability above about 100° C., high glass transition temperature, high tensile strength, elasticity, and chemical stability.

In some embodiments, the presently disclosed subject matter provides a proton exchange membrane comprising a copolymer comprising a fluorinated polydiene and a sulfonated polystyrene. In some embodiments, the presently disclosed subject matter provides an electrochemical cell comprising such a proton exchange membrane. In some embodiments, the electrochemical cell comprises a fuel cell.

In some embodiments, the presently disclosed subject matter provides a fabric comprising a copolymer comprising a fluorinated polydiene and a sulfonated polystyrene. In some embodiments, the fabric comprises an article of chemical-biological protective clothing. In some embodiments, the fabric comprises an article of material used to cover an agricultural product.

In some embodiments, the presently disclosed subject matter provides a template for sol-gel polymerization comprising a copolymer comprising a fluorinated polydiene and a sulfonated polystyrene.

In some embodiments, the presently disclosed subject matter provides a method for preparing a sulfonated crosslinked poly(cyclohexadiene) polyelectrolyte, the method comprising:
(a) providing a poly(cyclohexadiene);
(b) crosslinking the poly(cyclohexadiene) to form a crosslinked poly(cyclohexadiene);
(c) aromatizing the crosslinked poly(cyclohexadiene) to form a poly(phenylene); and
(d) sulfonating the poly(phenylene) to form a sulfonated crosslinked poly(cyclohexadiene) polyelectrolyte.

In some embodiments, the crosslinking comprises a polydiene vulcanization process. In some embodiments, the aromatizing comprises a dehydrogenation process. In some embodiments, the presently disclosed subject matter provides a proton exchange membrane comprising a cross-linked poly(cyclohexadiene) polymer. In some embodiments, the presently disclosed subject matter provides a polyelectrolyte comprising a cross-linked poly(cyclohexadiene) polymer. In some embodiments, the cross-linked poly(cyclohexadiene) polymer is aromatized. In some embodiments, the cross-linked poly(cyclohexadiene) polymer is sulfonated. In some embodiments, the cross-linked poly(cyclohexadiene) polymer comprises poly(1,3-cyclohexadiene).

Thus, in some embodiments, the presently disclosed subject matter provides block graft copolymers with fluorinated blocks, as well as charged blocks, for example, sulfonated blocks. If the content of sulfonated polystyrene in the copolymer is relatively low, a structure having a hydrophobic semi-crystalline continuous phase comprising dispersed nanoscale ionic clusters will be generated via self-assembly. By regulating the composition, molecular weight, and architecture, the structure, and thus the properties, can be optimized for a range of applications.

The presently disclosed fluorinated and sulfonated block copolymers provide basic understanding in the synthesis, structure, and properties of new classes of materials useful in a range of applications including portable power supplies, such as fuel cells and/or improved batteries, and protection against chemical and biological threats. The chemical properties of the materials provide an economical alternative for fuel cell membranes, while additionally allowing tailoring of relevant mechanical and transport properties through control of molecular architecture and chemical functionality.

Accordingly, it is an object of the presently disclosed subject matter to provide a new class of materials for use as a proton exchange membrane. Further, it is an object of the presently disclosed subject matter to provide a new class of fabrics, such as materials that provide protection against chemical and biological threats. These and other objects are achieved in whole or in part by the presently disclosed subject matter.

Objects and aspects of the presently disclosed subject matter having been stated hereinabove, other objects and aspects will become evident as the description proceeds when taken in connection with the accompanying Drawings and Examples as best described herein below.

BRIEF DESCRIPTION OF THE DRAWINGS

FIG. 6A is an FTIR spectrum of a presently disclosed PCHD membrane. FIG. 6B is an FTIR spectrum of a presently disclosed sulfonated, aromatized PCHD membrane.

FIG. 7A is an SEM micrograph of a presently disclosed PCHD membrane before sulfonation. FIG. 7B is an SEM micrograph of a presently disclosed PCHD membrane after sulfonation.

DETAILED DESCRIPTION

Figure 1:
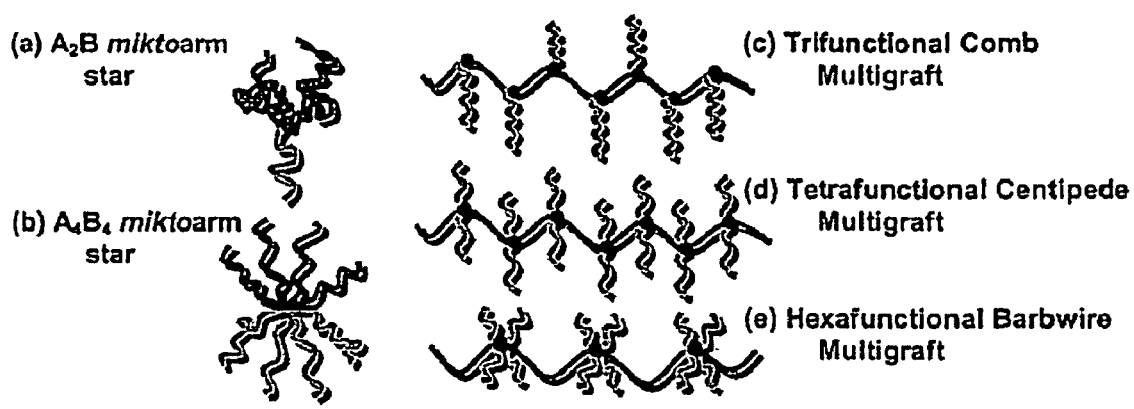
FIGS. 1A-1E are schematic representations of the presently disclosed branched block copolymer architectures.

The presently disclosed subject matter will now be described more fully hereinafter with reference to the accompanying Examples and Drawings, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such isomers and mixtures exist.

The presently disclosed subject matter provides in some embodiments (1) synthesis of new fluorinated and charged block copolymers; (2) morphological characterization of these materials both in the bulk form and in the presence of water and salts; and (3) investigation of application relevant material properties, such as mechanical properties, charge transport, and water transport.

As provided herein below, in some embodiments, anionic polymerization coupled with appropriate postpolymerization chemistry is used to create a wide range of charge neutral copolymers of various compositions and morphologies.

I. Definitions

As used herein, the term "anionic polymerization" refers to an ionic polymerization in which the kinetic chain carriers are anions. Accordingly, an anionic polymerization reaction is a chain reaction in which the growth of the polymer chain proceeds by reaction(s) between a monomer(s) and a reactive site(s) on the polymer chain with regeneration of the reactive site(s) at the end of each growth step. Anionic polymerization typically takes place with monomers comprising electron-withdrawing groups, such as nitrile, carboxyl, phenyl, and vinyl, or with monomers that can stabilize the anions through resonance. These polymerizations are initiated by nucleophilic addition to the double bond of the monomer, wherein the initiator comprises an anion, such as hydroxide, alkoxides, cyanide, or a carbanion. In some embodiments, the carbanion is generated from an organometallic species, such as an alkyl lithium, e.g., butyl lithium, or a Grignard reagent. Anionic polymerization typically is used to produce macromolecules from monomers that contain a carbon-carbon double bond, such as styrene and/or butadiene. Such reactions are referred to as anionic vinyl polymerization.

As used herein, a "monomer" refers to a molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality of units derived from molecules of lower relative molecular mass.

A "polymer" refers to a substance composed of macromolecules.

A "copolymer" refers to a polymer derived from more than one species of monomer.

As used herein, a "block macromolecule" refers to a macromolecule that comprises blocks in a linear sequence. A "block" refers to a portion of a macromolecule that has at least one feature that is not present in the adjacent portions of the macromolecule. A "block copolymer" refers to a copolymer in which adjacent blocks are constitutionally different, i.e., each of these blocks comprises constitutional units derived from different characteristic species of monomer or with different composition or sequence distribution of constitutional units.

For example, a diblock copolymer of polybutadiene and polystyrene is referred to as polybutadiene-block-polystyrene. Such a copolymer is referred to generically as an "AB block copolymer." Likewise, a triblock copolymer can be represented as "ABA." Other types of block polymers exist, such as multiblock copolymers of the $(AB)_n$ type, ABC block polymers comprising three different blocks, and star block polymers, which have a central point with three or more arms, each of which is in the form of a block copolymer, usually of the AB type.

As used herein, a "graft macromolecule" refers to a macromolecule comprising one or more species of block connected to the main chain as side chains, wherein the side chains comprise constitutional or configurational features that differ from those in the main chain.

A "branch point" refers to a point on a chain at which a branch is attached. A "branch," also referred to as a "side chain" or "pendant chain," is an oligomeric or polymeric offshoot from a macromolecule chain. An oligomeric branch can be termed a "short chain branch," whereas a polymeric branch can be termed a "long chain branch."

A "chain" refers to the whole or part of a macromolecule, an oligomer, or a block comprising a linear or branched sequence of constitutional units between two boundary constitutional units, wherein the two boundary constitutional units can comprise an end group, a branch point, or combinations thereof.

A "linear chain" refers to a chain with no branch points intermediate between the boundary units.

A "branched chain" refers to a chain with at least one branch point intermediate between the boundary units.

A "main chain" or "backbone" refers to a linear chain from which all other chains are regarded as being pendant.

A "long chain" refers to a chain of high relative molecular mass.

A "short chain" refers to a chain of low relative molecular mass.

An "end group" refers to a constitutional unit that comprises the extremity of a macromolecule or oligomer and, by definition, is attached to only one constitutional unit of a macromolecule or oligomer.

A "comb macromolecule" refers to a macromolecule comprising a main chain with multiple trifunctional branch points from each of which a linear side chain emanates.

A "statistical copolymer" refers to a copolymer comprising macromolecules in which the sequential distribution of the monomeric units obeys known statistical laws, including, but not limited to Markovian statistics.

A "polyelectrolyte molecule" refers to a macromolecule in which a substantial portion of the constitutional units has ionizable or ionic groups, or both.

An "ionomer molecule" refers to a macromolecule in which a small but significant proportion of the constitutional units have ionizable or ionic groups, or both.

A "star polymer" refers to a polymer comprising a macromolecule comprising a single branch point from which a plurality of linear chains (or arms) emanate. A star polymer or macromolecule with "n" linear chains emanating from the branch point is referred to as an "n-star polymer." If the linear chains of a star polymer are identical with respect to constitution and degree of polymerization, the macromolecule is referred to as a "regular star macromolecule." If different arms of a star polymer comprise different monomeric units, the macromolecule is referred to as a "variegated star polymer."

A "miktoarm star polymer" refers to a star polymer comprising chemically different (i.e., "mixed") arms, thereby producing a star polymer having the characteristic of chemical asymmetry.

As used herein, the term "chemical-biological" refers to chemical and/or biological agents, including hazardous and/or toxic chemicals and microorganisms, such as, but not limited to, chemical-biological warfare agents, viruses, bacteria, blood-borne pathogens, air-borne pathogens, industrial chemicals, and agricultural chemicals, in liquid, vapor, and aerosol forms.

As used herein, the term "breathable fabric," "breathable material," or an article, for example, an article of clothing, comprising breathable fabric and/or breathable material refers to a fabric and/or a material that allows perspiration products to escape from, for example, a body, while preventing the penetration and/or transport of undesired hazardous materials, such as, but not limited to, chemical-biological warfare agents, viruses, bacteria, blood-borne pathogens, air-borne pathogens, industrial chemicals, and agricultural chemicals, in liquid, vapor, and aerosol forms, through the fabric and/or material.

As used herein the term "alkyl" refers to $C_{1-20}$ inclusive, linear (i.e., "straight-chain"), branched, or cyclic, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-8}$ straight-chain alkyls. In other embodiments, "alkyl" refers, in particular, to $C_{1-8}$ branched-chain alkyls.

Alkyl groups can optionally be substituted with one or more alkyl group substituents, which can be the same or different. The term "alkyl group substituent" includes but is not limited to alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. There can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

As used herein, the terms "substituted alkyl," "substituted cycloalkyl," "substituted alkylene," "substituted aryl," and "substituted arylene" include alkyl, alkylene, and aryl groups, as defined herein, in which one or more of the hydrogen atoms of the alkyl, alkylene, aryl or arylene group are replaced with another atom or functional group, including for example, halogen, aryl, alkyl, alkoxyl, hydroxyl, nitro, amino, alkylamino, dialkylamino, sulfate, and mercapto.

"Alkoxyl" or "alkoxyalkyl" refer to an alkyl-O— group wherein alkyl is as previously described. The term "alkoxyl" as used herein can refer to $C_{1-20}$ inclusive, linear, branched, or cyclic, saturated or unsaturated oxo-hydrocarbon chains, including, for example, methoxyl, ethoxyl, propoxyl, isopropoxyl, butoxyl, t-butoxyl, and pentoxyl.

II. Synthesis of Fluorinated Polydiene and Sulfonated Polystyrene Block Copolymers The presently disclosed subject matter provides the synthesis, properties, and morphology of a range of polymers comprising partially fluorinated polydienes, such as 1,4-polybutadiene, isoprene and cyclohexadiene, and partially or fully sulfonated polystyrene.

Fluorination of polydienes by generation of difluorocarbene has been reported by Cais, R. B., et al., *Macromolecules*, 19, 595 (1986), using PhHgCF$_3$ as the fluorine source, and by Thomson, M. W., *Macromolecules*, 22, 481 (1989), via irradiation of chlorofluorocarbons. Further, Ren, Y., et al., *J. Am. Chem. Soc.*, 120, 6830 (1998), have reported a facile method for fluorination of polydienes based upon difluorocarbene addition. This reaction employs the relatively inexpensive hexafluoropropylene oxide as a reagent and does not lead to substantial chain scission or crosslinking.

For example, when polybutadiene with a high 1,4-microstructure is treated with hexafluoropropylene oxide, the conversion is quantitative and the resulting semicrystalline polymer has a $T_g$ of 89° C., a $T_m$ of 150° C., and exhibits good thermal stability. A sample of similarly fluorinated polyisoprene retained 99.7% of its weight when heated at 200° C. under nitrogen for one hour. See Ren, Y., et al., *J. Am. Chem. Soc.*, 120, 6830 (1998). Analogous chemistries carried out on 1,4-polyisoprene, as well as polycyclohexadiene, yield an amorphous product, which also is of interest.

Copolymers of butadiene and styrene can be produced with a range of architectures encompassing diblock, triblock, statistical, and graft copolymers. Triblock copolymers of styrene and butadiene make up a commercially important class of thermoplastic elastomers. When anionic polymerization is employed in the synthesis, well-defined structures having controlled molecular weights, compositions, and narrow polydispersities can be synthesized.

In some embodiments of the presently disclosed subject matter, the synthesis of block and graft copolymers of fluorinated polydienes (e.g., butadiene, isoprene, and cyclohexadiene) and polystyrene sulfonate occurs in three steps: (1) synthesis of the polystyrene (PS)-polydiene block copolymer comprising the desired architecture and composition, (2) fluorination of the polydiene blocks, and (3) sulfonation of the PS blocks to yield the final product. The first two steps can yield two other block copolymer materials, a conventional PS-polydiene, as well as a fluorinated polydiene-PS material.

In some embodiments of the presently disclosed subject matter, the polybutadiene block of such materials can be partially fluorinated by reaction with difluorocarbene (or perfluoroalkyl iodides—see Scheme 1 below), followed by sulfonation of the polystyrene blocks. After fluorination of the polybutadiene component, the polystyrene segments can be sulfonated using reagents, such as acetyl sulfate or sulfur trioxide, to form poly(styrene sulfonic acid) (PSS).

Scheme 1. Post-Polymerization Fluorination of Polybutadiene (PBD) and Sulfonation of Polystyrene (PS) in a PS-PBD Block Copolymer.

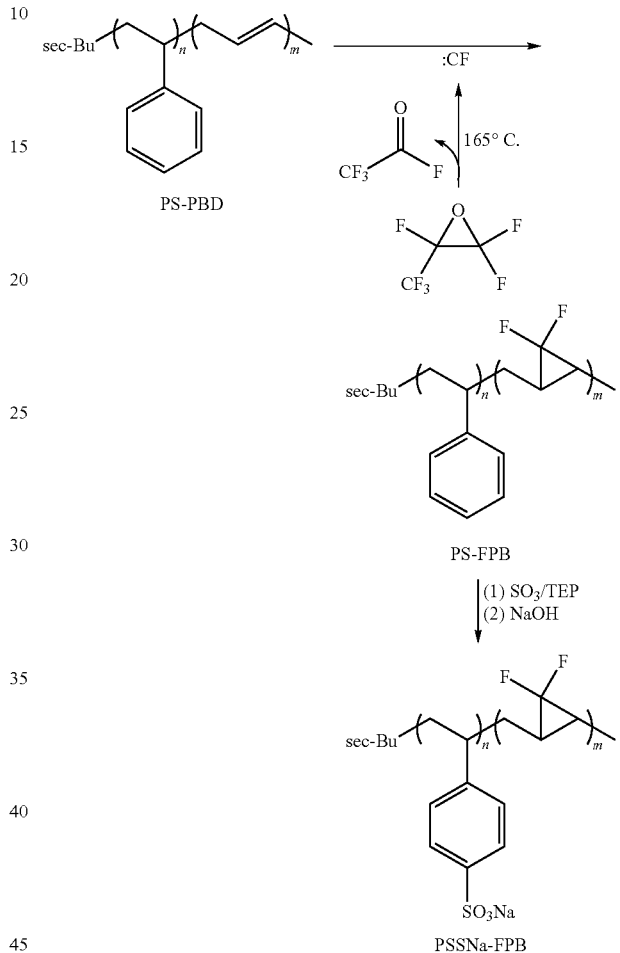

Poly(styrene sulfonic acid) (PSS) is an effective proton conductor. In some embodiments of the presently disclosed subject matter, if the composition of the copolymer is chosen so that the fluorinated polybutadiene (FPB) volume fraction is considerably larger than the PSS volume fraction, i.e., the content of sulfonated polystyrene in the copolymer is relatively low, then a structure having a hydrophobic semi-crystalline continuous phase containing dispersed nanoscale ionic channels is obtained via self-assembly. By tuning the composition, molecular weight, and architecture (readily done using anionic polymerization), the morphology, structure, and properties is manipulated.

Less pronounced hydrophobic/hydrophilic phase separation, which would be present in an FPB/PSS copolymer as compared to NAFION® material, can lead to advantages in methanol fuel cells due to their difference in permeability. While these native FPB/PSS copolymer materials might lack adequate thermal stability for use in methanol fuel cells well above 100° C., they can be provided at low cost. Also, subsequent modification to form inorganic hybrid materials can be used to improve their high-temperature capability.

Within the context of fuel cells, less distinct phase separated morphologies are beneficial in the sense of less-tortuous proton hopping pathways. The process of fluorination, as described herein below, increases chemical stability. With regard to thermal and morphological stability, insertion of inorganic oxide nanostructures into the hard block regions lock in the phase-separated morphology at temperatures around or exceeding 100° C. in the case of membranes expected to operate at high temperatures. Further, by tailoring gradients of intimately incorporated inorganic oxide nanostructures, water activity gradients are generated for the purpose of water management optimization.

III. ABA Triblock Copolymer Cylinders

Triblock copolymers of styrene and butadiene make up a commercially important class of thermoplastic elastomers. The polybutadiene (PBD) block of such materials can be partially fluorinated by reaction with difluorocarbene, followed by sulfonation of the polystyrene blocks.

A series of ABA triblock copolymers are synthesized, in which the outer A blocks are polydiene, e.g., isoprene (IS), polybutadiene (PBD), and cyclohexadiene (CHD), and the inner B block is polystyrene (PS). This arrangement is the opposite block arrangement to the normal thermoplastic elastomer KRATON®-like materials (KRATON Polymers U.S. LLC, Houston, Tex., United States of America) in which the PS blocks are in the A position on the ends of the molecule to provide mechanical reinforcement. In some embodiments, the PS blocks are sulfonated. In some embodiments, the PS blocks are hydrated. In embodiments wherein the PS blocks are hydrated, the PS blocks can be plasticized in the end-use application.

Once fluorinated, the polydiene blocks become strongly hydrophobic and mechanically stiffened. The fluorinated PBD is semicrystalline with a melting temperature of about 150° C., and the fluorinated polycyclohexadiene (PCHD) is an amorphous material with a high $T_g$. Hydrogenated PCHD is known have a $T_g$ between about 200° C. and about 250° C., depending on microstructure. Thus, in some embodiments, the polydienes of the presently disclosed subject matter fulfill a mechanically toughening role.

III.A. Synthesis of Linear ABA Triblocks

Linear triblock copolymers of an ABA architecture, wherein A is polybutadiene (PBD) or polyisoprene (PI) and B is polystyrene (PS), can be prepared. The logic of starting with a simple linear architecture is the ease of synthesis of these materials and the well-known good mechanical properties of the ABA architecture. In some embodiments of the presently disclosed subject matter, these materials are made using anionic polymerization and all-glass reactors with breakseals. In some embodiments of the presently disclosed subject matter, a double diphenylethylene lithium-based initiator (see below) is used in benzene (with addition of lithium butoxide) at room temperature in the synthesis of the middle block.

A sample of the PS is then taken for characterization and the diene, i.e., either PBD or PI, is added to the reactor to grow the triblock. An advantage of this method is in allowing the synthesis of high 1,4-polydiene (addition of lithium butoxide has minimal effect on microstructure). This synthetic approach also facilitates rigorous characterization of the products.

III.B. Fluorination and Sulfonation Procedures

In some embodiments of the presently disclosed subject matter, cyclohexane solutions of the styrene/diene copolymers are subjected to hexafluoropropylene oxide (HFPO) at 180° C. using a high-pressure reactor as reported by Ren, Y., et al., *J. Am. Chem. Soc.*, 120, 6830 (1998) in the presence of butylated hydroxy toluene (BHT). At this temperature, HFPO generates difluorocarbene, which selectively adds to dienic unsaturation. The fluorinated products are then isolated, characterized and subjected to sulfonation. Higher fluorine levels can be incorporated through addition of perfluoroalkyl iodides to the diene double bonds, as reported by Ren. Y., et al., *Macromolecules*, 34, 4780 (2001), in which optimized reaction conditions for modification of a styrene-butadiene diblock copolymer can lead to consumption of 95% of the double bonds in the diene block, while preserving the narrow molecular weight distribution.

In some embodiments of the presently disclosed subject matter, the PS segments are sulfonated using a $SO_3$/triethylphosphate complex or with acetylsulfate. The former system is most useful for carrying out exhaustive sulfonation of the PS segments, whereas the latter system is effective for carrying out partial sulfonation. In some embodiments, the sulfonations are carried out in a chloroalkane, such as dichloroethane, at ambient or lower temperatures. For polymers containing fluorinated 1,4-PBD segments, however, sulfonations are conducted on solutions at higher temperatures or on thin films of polymer due to the more limited solubilities of these materials.

In some embodiments, materials with initial PS volume fractions of about 0.18 are provided to form PS cylinders in a polydiene matrix. This composition is formulated toward the lower end of the PS cylinder volume fraction range to accommodate some PS volume fraction increase upon sulfonation without pushing the samples out of the cylindrical morphology. Holding the PS volume fraction as constant as possible, the molecular weight of the overall material is varied from a low of about 20,000 g/mol to a high value depending upon whether (1) the polydiene block is PBD (high of 200,000 g/mol) or (2) PCHD (high of 30,000 g/mol). The overall molecular weight of the PCHD-containing materials is limited by synthetic difficulties in achieving PCHD block molecular weights greater than about 30,000 g/mol. See Hong. K. and Mays, J. W., *Macromolecules*, 34, 3540 (2001); Hong, K. and Mays, J. W., *Macromolecules*, 34, 782 (2001); and Hong. K., et al., *Macromolecules*, 34, 2482 (2001).

The full molecular weight range is spanned by 4 to 5 samples for each of these two embodiments. For instance, for PS-PBD, the molecular weight ranges from 20,000; 50,000; 100,000; 150,000; and 200,000 g/mol total molecular weight with PS volume fraction about 0.18 in all samples. The molecular weight ranges from about 10,000 g/mol to about 50,000 g/mol for PS-PCHD.

Samples from these series are obtained as original PS-polydiene materials, as fluorinated materials, and as fluorinated and sulfonated materials for morphology and properties evaluation.

IV. ABA Triblock Copolymer Lamellae

A series of ABA triblock copolymers are provided in which the outer A blocks comprise polydiene and the inner B block comprises polystyrene (PS) or poly(α-methylstyrene) (PαMS). Materials with initial PS volume fractions of around 0.45 are prepared to form alternating PS/polydiene lamellae. This composition is formulated toward the lower end of the PS volume fraction range for lamellae to accommodate some PS volume fraction increase upon sulfonation without pushing the samples out of the lamellar morphology. Holding the PS volume fraction as constant as possible, the molecular weight of the overall material from a low of about 20,000 g/mol to a high value depending upon whether the polydiene block is (1) PBD (high of 200,000 g/mol) or (2) PCHD (high of 110,000 g/mol). The full molecular weight range is spanned by 4 to 5 samples for each of these two embodiments. For instance, for PS-PBD the molecular weight ranges from 20,000; 50,000; 100,000; 150,000; and 200,000 g/mol total molecular weight with a PS volume fraction of 0.45 in all samples. Samples from these series are obtained as original PS-polydiene materials, as fluorinated materials, and as fluorinated and sulfonated materials for morphology and properties evaluation. Molecular weight ranges similar to those observed for PS-PBD are obtained for PαMS-PBD, whereas a lower molecular weight ranging from about 10,000 g/mol to about 50,000 g/mol is obtained for PS-PCHD and PαMS-PCHD.

V. Graft Copolymer Cylinders

In some embodiments of the presently disclosed subject matter, the aim to produce a self-reinforcing rigid matrix of the fluorinated PBD (semicrystalline) or PCHD (high $T_g$) surrounding sulfonated PS cylinders is addressed by starting with the following architectures of polydiene backbones and PS grafts: grafted PS blocks at trifunctional (comb), tetrafunctional (centipede) or hexafunctional (barbwire) branch points as provided in FIGS. 1A-1E. Thus, the synthesis of the initial molecular architectures uses the chemical strategies as provided immediately herein below for constructing well-defined branched and grated molecular architectures in PBD-PS materials as a route to achieving these architectures in the fluorinated and sulfonated materials.

Accordingly, provided herein below is an overview of the strategies employed to make (a) single branch point mixed arm star architectures, and (b) multigraft copolymers with regularly spaced branched points of controlled functionality.

V.A. Multigraft Synthetic Strategies—General Considerations

In some embodiments of the presently disclosed subject matter, polymer backbone segments (for example, PBD or PI) are made using the dilithium initiator:

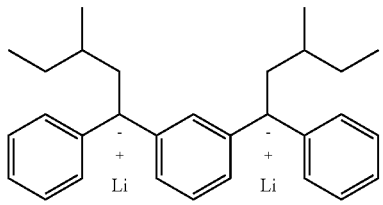

Difunctional Lithium Initiator (DLi)

Accordingly, architecturally precise, multigraft block copolymers with trifunctional, tetrafunctional, or hexafunctional branch points are produced using the general macromonomer end-linking reaction scheme shown below:

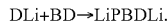
DLi+BD→LiPBDLi.

Polymer branches (for example, PS) are made using a monofunctional anionic initiator, e.g., sec-BuLi:

sec-BuLi+S→PSLi.

V.B. Comb Synthesis

In some embodiments of the presently disclosed subject matter, multigraft polymers comprising a "comb" architecture are synthesized via the following reaction scheme:

PSLi+MeSiCl₃(large excess)→(PS)(Me)SiCl₂+ MeSiCl₃↑

(PS)(Me)SiCl₂+LiPBDLi(small excess)→PBD[Si(PS)(Me)]ₙPBD.

V.C. Centipede Synthesis

In some embodiments of the presently disclosed subject matter, multigraft polymers comprising a "centipede" architecture are synthesized via the following reaction scheme:

PSLi+SiCl₄(vacuum titration)→(PS)₂SiCl₂

(PS)₂SiCl₂+LiPBDLi→PBD[Si(PS)₂]ₙPBD.

V.D. Branched and Grafted Block Copolymer Molecular Architecture

In some embodiments of the presently disclosed subject matter, chlorosilane coupling agents are used to link together living PS and PBD chains, which have been synthesized anionically. The final structure is precisely controlled with regard to the molecular weights of the PS graft blocks and the molecular weights of the PBD connectors between each grafting point. The end-linking chemistry, however, is similar kinetically to a condensation polymerization (step growth) and thus produces a distribution of total molecular weights, i.e. there is a distribution in the total PBD backbone length and the number of PS grafts. Previous work has demonstrated that near-monodisperse samples of graft copolymer with a precise number of grafts can be obtained from the overall reaction product by solvent-nonsolvent fractionation. See Beyer et al., *Macromolecules*, 33, 2039 (2000).

In cases where degradation of chlorosilane-linked polymers at the branch point(s) occurs, more robust multigraft structures can be synthesized by metallating anionically produced polybutadiene (or polyisoprene) with BuLi/tetramethylethylene diamine, followed by polymerization of styrene from the anions created along the polymer backbone. See Hadjichristidis, N. and Roovers, J. E. L., *J. Polymer Sci., Polym. Phys. Ed.*, 16, 851 (1978). This method yields well-defined materials comprising a comb-like architecture where branches are randomly placed along the polymer backbone. Kennedy, J. P. and Delvaux, J. M., *Adv. Polym. Sci.*, 38, 141 (1981), previously reported superior mechanical properties for poly(isobutylene-g-styrene)s of this architecture. Further, morphological work by Xenidou. et al., *Macromolecules*, 31, 7659 (1998) has shown that the constituting block copolymer principle relating graft molecular architecture to morphology can be extended in an average sense to these more architecturally varied materials.

Fluorination and sulfonation procedures of the branched and grafted copolymers disclosed immediately hereinabove are carried out as described hereinabove for the triblock case, with modification as needed.

Using the chlorosilane coupling approach to multigrafts, samples with PS cylindrical domains in a PBD matrix with trifunctional (comb), tetrafunctional (centipede), and hexafunctional (barbwire) junction point architecture can be produced. Due to the effect of branch point functionality on morphology, the volume fraction range of PS in which cylinders is produced varies as the junction point functionality varies. To produce cylinders, the trifunctional comb sample has a PS volume fraction of about 0.40; the tetrafunctional centipede has a PS volume fraction of about 0.20; and the hexafunctional barbwire has a PS volume fraction of about 0.10. Thus, these embodiments of the presently disclosed subject matter provide an effect on the relative size of the cylindrical domains (with respect to the matrix) for desired properties.

Further, the polycondensation reaction of macromonomers by which the regular multigraft structures are produced, yields a distribution (polydispersity index (PDI) of about 2) of molecular weight in which all species have the same structure per junction point, but vary in the number of junction points linked along the backbone. Also, fractionation can be used to isolate different fractions with identical structure per junction point, but different (low, middle, and high) average numbers of junction point per molecule. See Beyer, F. L., et al., *Macromolecules,* 33, 2039 (2000); Uhrig, D. and Mays, J. W., *Macromolecules,* 35, 7182 (2002); Iatrou. H., et al., *Macromolecules,* 31, 6697 (1998) and Nakamura, Y., et al., *Macromolecules,* 33, 8323 (2000).

Although these low, middle, and high molecular weight fractions tend to form the same general morphology, cylinders for instance, they differ greatly in the degree of long-range order that can be achieved in the microstructure. The larger the number of junction points per molecule (molecular weight), the poorer the long-range order produced. By examining low, middle and high molecular weight fractions of the overall structure produced by the polycondensation of macromonomers, the influence of microstructural order on mechanical and transport properties can be compared and modified as desired. For example, samples with a high number of junction points per molecule, which, although microphase-separated, did not display long-range order, have been found to exhibit excellent tensile mechanical properties. See Weidisch, R., et al., *Macromolecules,* 34, 6333 (2001).

The following combinations of architecture, molecular weight, fluorination, and sulfonation provided in Table 1 are provided by the presently disclosed subject matter.

TABLE 1

| Representative Graft Copolymers | | | | |
|---|---|---|---|---|
| Graft Point Functionality | Molecular Weight Fraction | | | |
| 3 | Low | PBD-PS | FPBD-PS | FPBD-PSS |
| 3 | Middle | PBD-PS | FPBD-PS | FPBD-PSS |
| 3 | High | PBD-PS | FPBD-PS | FPBD-PSS |
| 4 | Low | PBD-PS | FPBD-PS | FPBD-PSS |
| 4 | Middle | PBD-PS | FPBD-PS | FPBD-PSS |
| 4 | High | PBD-PS | FPBD-PS | FPBD-PSS |
| 6 | Low | PBD-PS | FPBD-PS | FPBD-PSS |

TABLE 1-continued

| Representative Graft Copolymers | | | | |
|---|---|---|---|---|
| Graft Point Functionality | Molecular Weight Fraction | | | |
| 6 | Middle | PBD-PS | FPBD-PS | FPBD-PSS |
| 6 | High | PBD-PS | FHBD-PS | FPBD-PSS |

PBD = polybutadiene;
PS = polystyrene;
FPBD = fluorinated polybutadiene; and
PSS = poly(styrene sulfonic acid).

Additional details of these synthetic strategies, including the synthesis by analogous strategies, of the hexafunctional barbwire graft architecture, see Uhrig. D., and Mays, J. W., *Macromolecules,* 35, 7182 (2002), are provided in Beyer et al., *Macromolecules,* 33, 2039 (2000); Iatrou, H., et al., *Macromolecules,* 31, 6697 (1998); and Chang. M. Y., et al., *Macromolecules,* 35, 4437 (2002), each of which are incorporated herein by reference in their entirety.

VI. Statistical Copolymers of 1,3-cyclohexadiene and α-methylstyrene

Statistical copolymers of 1,3-cyclohexadiene and α-methylstyrene (aMS) provide another embodiment of the presently disclosed subject matter, which in some embodiments can be used at higher temperatures. The basic strategy, shown in Scheme 2, is similar to that disclosed hereinabove. As shown in Scheme 2, the polycyclohexadiene (PCHD) units in the copolymer are fluorinated using difluorocarbene, followed by sulfonation of PαMS. Based on the known characteristics of PCHD ($T_g$ of about 150° C., semicrystalline, ring structure) this material is expected to form a semicrystalline matrix of good thermal stability and high $T_g$. The PαMS segments are sulfonated (PαMSS) to facilitate proton transport.

The choice of αMS and a statistical, rather than block, copolymer is based, in part, on two reasons. First, the substitution of the tertiary hydrogen in polystyrene, which is susceptible to oxidative attack by $O_2$ or $H_2O_2$, with a methyl group provides a more stable material in membrane applications. Second, the tendency of PαMS chains, when they do degrade, to do so by "unzipping" to monomer, is prevented. The more weakly phase-separated morphologies formed by these systems can, as discussed hereinabove, offer permeability characteristics favorable for use in methanol fuel cells, coupled with improved thermal stability. These materials also are potentially low cost, because commercial production of the cyclohexadiene monomer is being considered.

Scheme 2

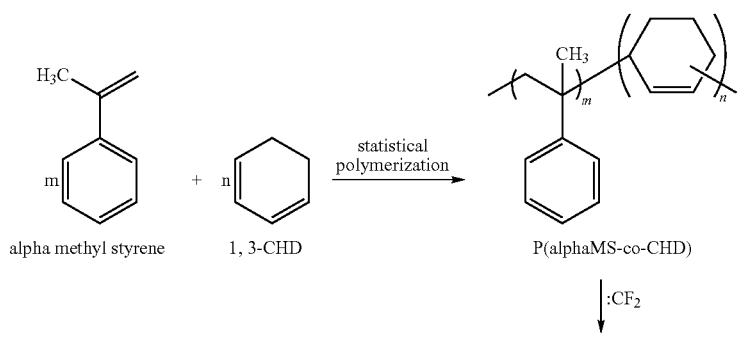

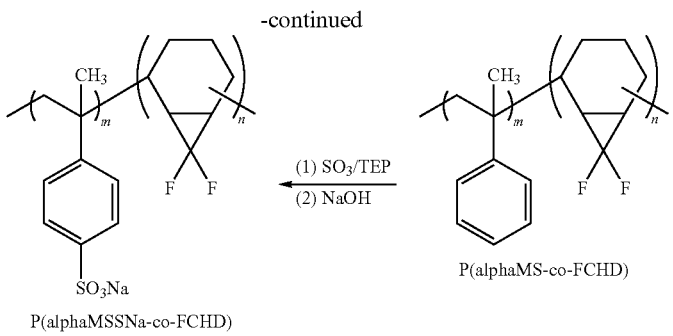

P(alphaMSSNa-co-FCHD) ← (1) SO₃/TEP / (2) NaOH — P(alphaMS-co-FCHD)

VII. Membranes Based on Poly(cyclohexadiene)

In some embodiments of the presently disclosed subject matter, the unusual chemical nature of poly(cyclohexadiene) (PCHD) provides a unique membrane based entirely on this polymer following several postpolymerization modifications as shown in Scheme 3.

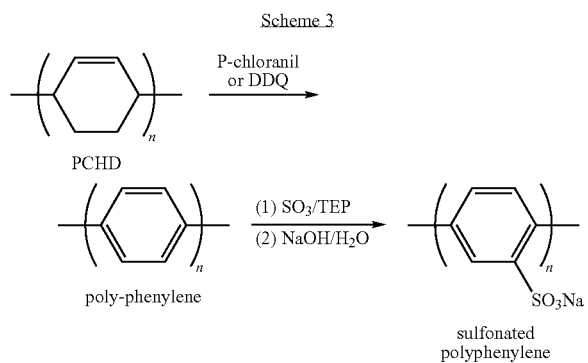

Films of the desired thickness are cast from PCHD solutions (ease of processing). The polymer is then covalently crosslinked (polydiene vulcanization, e.g., with peroxides), thus stabilizing the size and shape of the membrane. A chemical dehydrogenation step to aromatize the polymer (i.e., converting it into poly(phenylene)) using p-chloranil, 2,3-dichloro-5,6-dicyano-1,4-benzoquinone (DDQ), or related reagents is then carried out, see Williamson, D. T., et al., *ACS Polym. Preprints*, 43(2), 1201 (2002), followed by sulfonation. For example, the sulfonation of low molecular weight, aromatized PCHD results in a water soluble product.

Thus, the presently disclosed subject matter provides a method of forming a proton exchange membrane, the method comprising:
(a) casting a polymeric film from a solution of poly(cyclohexadiene);
(b) crosslinking the polymeric film to form a crosslinked polymeric film;
(c) aromatizing the polymeric film to form a poly(phenylene); and
(d) sulfonating the poly(phenylene).

Figure 2:
FIG. 2 is a photograph of a presently disclosed cross-linked poly(1,3-cyclohexadiene) (PCHD) membrane.

The resulting material is covalently and ionically crosslinked, and has a highly aromatic structure, which imparts excellent thermo-oxidative, chemical, and dimensional stability to the membrane. Note that even if complete aromatization of the diene is not carried out, any residual double bonds will be eliminated during sulfonation (alkene sulfonation). Combined covalent and ionic crosslinking of aromatic structures leads to membranes of improved dimensional stability with the potential for reduced methanol permeation. Thus, membranes comprising the currently disclosed materials exhibit outstanding potential for use in methanol fuel cells at temperatures well above 100° C. A photograph of a presently disclosed cross-linked poly(1,3-cyclohexadiene) (PHCD) membrane is shown in FIG. 2.

VIII. Self Assembling Barrier Elastomer (SABrE) Materials

Self Assembling Barrier Elastomer (SABrE) materials typically comprise block or graft copolymers of sulfonated polystyrene and polyisobutylene, which have elastomeric mechanical properties. The sulfonated polystyrene self-assembles to form nanometer size hydrophilic domains with cylindrical geometries that provide pathways for water transport (and thus breathability) across the hydrophobic butyl rubber (polyisobutylene) matrix. Due to their extremely small size and to their chemical functionality, these hydrophilic channels are not accessible to chemical and biological threats. Thus, SABrE materials exhibit the characteristic of selective transport. Further, when the SABrE material is based on a graft copolymer comprising many tetrafunctional graft points per molecule, then the material has exceptional mechanical properties.

Such materials can be used as a fabric, which in some embodiments can be a barrier fabric, for example for use as breathable chemical-biological protective barrier clothing for military personnel, emergency response teams, industrial and/or agricultural workers and/or other applications, and healthcare professionals. Indeed, any article or item that is desired to be covered can be covered, such as but not limited to plants (indeed, any form of vegetation) or other agricultural applications in an environment where coverage would be of interest for at least a period of time, and industrial equipment that is maintained in an environment where coverage would be desirable for at least a period of time. Standard protective clothing is made largely from butyl rubber (BR), a material whose impermeability provides an excellent level of protection, but also traps heat and moisture inside the garments. BR garments also are bulky and limit dexterity. For example, a particular problem with gloves made from BR materials is that they constrain hand movement. In a desert combat environment these problems could result in more than simple discomfort and inconvenience.

The fluorinated and sulfonated materials of the presently disclosed subject matter are directly applicable to SABrE materials. Microphase separated block copolymers have the potential to economically produce protective fabrics, which in some embodiments act as barrier materials, with improved breathability, comfort and wear resistance. A strategy for doing this is to exploit the excellent barrier properties of an impermeable polymer matrix, while at the same time blending in block copolymers which microphase separate to form membrane spanning channels. Such block copolymers include materials comprising sulfonated PS blocks, Variations in the molecular architecture of graft copolymers can be manipulated to control the nano-scale structure (morphology) and the ability to form long-range order during self-assembly. Synthetic techniques have been developed to produce the precisely controlled molecular architectures, some of which are provided in FIGS. 1A-1E. Further, such well-defined molecular architecture is related to morphology and properties. As a result, morphology and long-range order of microphase separated structures can be controlled through molecular design.

The presently disclosed subject matter utilizes this control of morphology to tailor properties of fluorinated ionomer materials which share some of the block and grafted architectural features of previously reported non-fluorinated materials.

To optimize performance, the size, shape and symmetry, and overall volume fraction of different types of domains are controlled independently. This independent control, however, is not possible with conventional linear AB diblock copolymers and ABA triblock copolymers for which the nanophase separated morphology which forms (e.g., spheres, cylinders, cubic bicontinuous gyroid, or lamella) is tied directly to the relative volume fractions of the two block materials. For example, if an application such as SABrE demands a material with microphase-separated nanometer length scale cylinders in which the component comprising the conductive cylindrical domain makes up over 50 volume percent of the material, linear block copolymers would not be preferred.

One way to uncouple block copolymer morphology from its rigid dependence on component volume fractions is to vary molecule architecture. By way of example, for mixed arm star architectures such as the $A_2B$ shown in FIG. 1A, the asymmetry factor is: $\epsilon=(n_A/n_B)/(\zeta_A/\zeta_B)$, wherein $(n_A/n_B)$ is the ratio of arm numbers of the two block types and represents the asymmetry due to the architecture and the conformational asymmetry between the two block materials is expressed by the ratio, $(\zeta_A/\zeta_B)$, wherein $\zeta_i$ is the ratio of segmental volume to the square of statistical segment length for the block material i.

Methods to determine the architectural asymmetry part of a generalized asymmetry parameter for any of the various graft copolymer architectures encountered have been developed. Further, these methods have been tested with extensive morphological studies of model star and graft shaped block copolymers. Also, complex graft copolymer architectures with multiple grafting points (e.g., FIGS. 1C-1E) can be understood morphologically by analogy to fundamental building blocks defined as the average structure per junction. This fundamental component of a larger graft molecular architecture is referred to as the "constituting block copolymer." For a graft copolymer with a backbone of A and blocks of B joined to the backbone at trifunctional branch points (see, e.g., FIG. 1C), the constituting block copolymer is an $A_2B$ single graft copolymer (see FIG. 1A).

Previous characterization data on complex graft copolymer architectures with multiple grafting points has been fit into the framework of a theoretical morphology diagram (see FIG. 3) calculated by Milner. S. T., *Macromolecules*, 27, 2333 (1994), whose analysis predicts morphology as a function of composition and molecular asymmetry (architecture) for materials with a single junction point. For example, at $\epsilon=1$, the Milner diagram models linear, conformationally symmetric, AB diblock behavior with symmetric morphology windows around $\phi_B=0.5$. As the number of arms of one species increase relative to the other, however, the morphological behavior can become strongly asymmetric with respect to volume fraction. This behavior allows the sought after uncoupling of morphology from volume fraction to be achieved. Thus, the morphology can be varied independently of volume fraction by adjusting the molecular architecture. Milner's theory is not strictly applicable to more complex, multiple graft copolymer materials, however. The use of the building block principle of the constituting block copolymer to understand the morphological behavior of multiple graft materials by mapping them back to the more well-understood behavior of single graft materials has been required. These ideas have been used to develop a rational framework for predicting the morphologies of all the types of molecular architecture shown in FIGS. 1A-1E.

Figure 3:
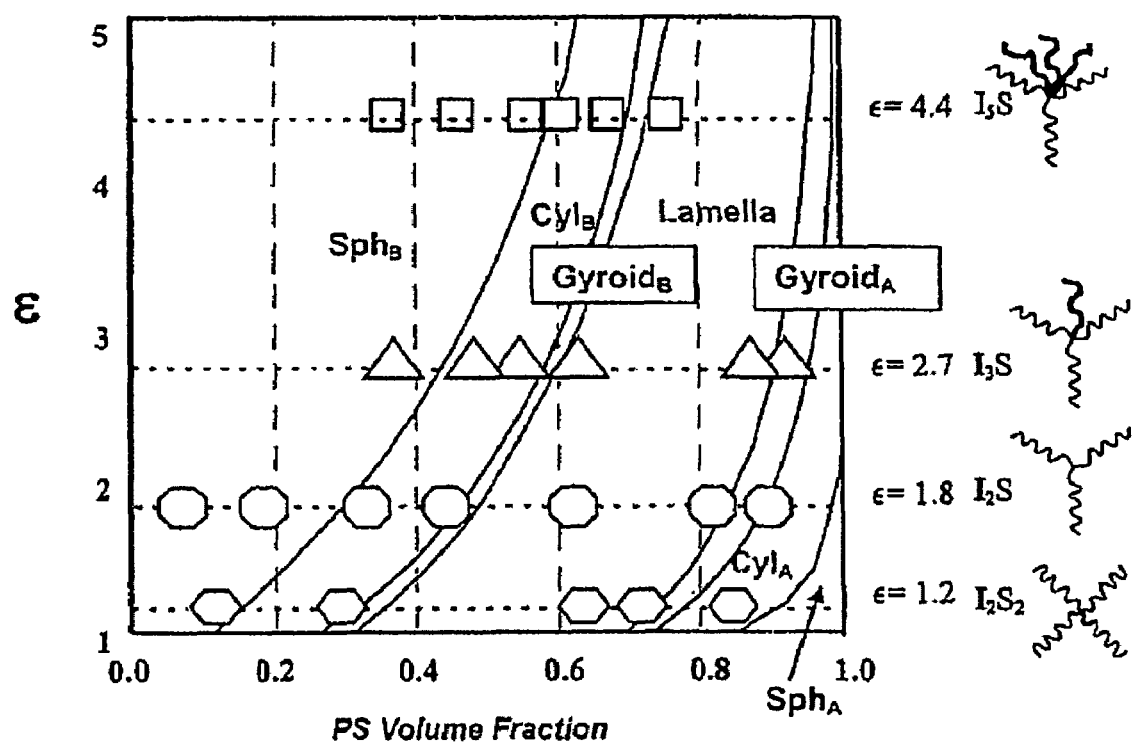
FIG. 3 is a miktoarm star morphology diagram based on experimental results.

As disclosed hereinabove, FIG. 3 shows experimental data from previous work on a range of different branched molecular architectures plotted on the morphology diagram. This morphology diagram now provides the background necessary to move forward on materials with similar architectures, but dramatically different fluorinated and charged block materials for different applications, such as fuel cells.

IX. Templates for Sol-Gel Polymerization

In some embodiments of the presently disclosed subject matter, phase-separated ionomers, such as those described herein, can act as templates for sol-gel polymerizations of metal alkoxides to generate nanostructured membranes. Previous studies involving NAFION® material have shown that $H_2O$ molecules hydrogen bond to ≡SiOH groups on inserted silicate nanostructures and $H^+$ hopping is possible along percolated hydration nanostructures. NAFION®/silicate membranes have greater internal polarity and hydrative capacity than NAFION®-$H^+$ membranes due to ≡SiOH functionalities. See Deng. Q., et al., *Chem. Mater.* 7, 2259 (1995); Deng, Q., et al., *J. Sol-Gel Sci. & Technol.* 7, 177 (1996); Deng, Q., et al., *J. Polymer Sci. B: Polymer Phys.* 34, 1917-1923 (1996); and Deng. Q., et al., *Them. Mater.* 9, 36 (1997).

Also, sulfonated poly(styrene-isobutylene-styrene) block copolymers and commercial KRATON® triblock copolymers can induce domain-targeted sol-gel polymerizations in styrenic regions during film formation resulting in self-assembled organic/inorganic nanostructured membranes. The water affinity of these block copolymers increases with sulfonation, but dramatically increases after silicate nanophase incorporation. There are cases where sulfonation can induce morphological transformations, which is another variable available for structural tailoring for membrane optimization.

X. Representative Applications

In some embodiments, the presently disclosed copolymers of fluorinated polydienes and sulfonated polystyrene and, in some embodiments, the presently disclosed cross-linked poly (1,3-cyclohexadiene (PCHD) polymers can be used in the following representative applications, including, but not limited to, a proton exchange membrane for a fuel cell, a polyelectrolyte for a battery, and a fabric, for example, for use as breathable chemical-biological protective clothing.

X.A. Proton Exchange Membrane

In some embodiments, the presently disclosed copolymers of fluorinated polydienes and sulfonated polystyrene and the presently disclosed cross-linked poly(1,3-cyclohexadiene (PCHD) polymers can be used as a proton exchange membrane in an electrochemical cell, for example, a fuel cell.

Figure 4:
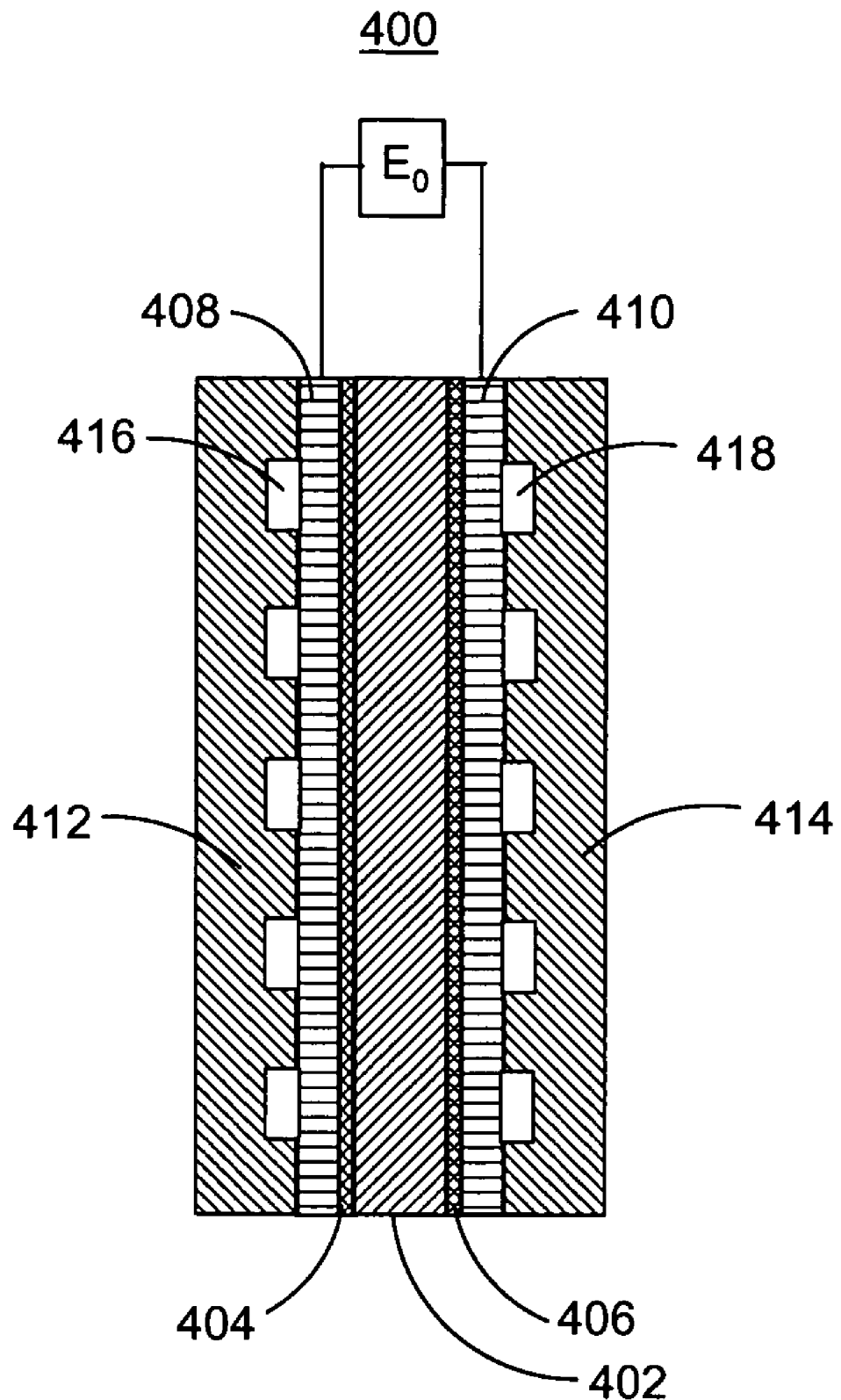
FIG. 4 is a schematic of an electrochemical cell, such as a fuel cell, comprising a proton exchange membrane comprising the presently disclosed copolymers of fluorinated polydiene and sulfonated polystyrene and the presently disclosed cross-linked poly(1,3-cyclohexadiene) polymers.

Referring now to FIG. 4, fuel cell 400 comprises proton exchange membrane 402, which, in some embodiments comprises a presently disclosed copolymer of a fluorinated polydiene and a sulfonated polystyrene, and, in some embodiments, comprises a presently disclosed cross-linked poly(1,3-cyclohexadiene) polymer.

Referring again to FIG. 4, proton exchange membrane 402 is operationally positioned between and contacted with first catalyst layer 404, e.g., an anodic catalyst layer, and second catalyst layer 406, e.g., a cathodic catalyst layer, which are contacted with first electrode 408, e.g., an anodic electrode, and second electrode 410, e.g., a cathodic electrode, respectively. The body of fuel cell 400 is formed by layers or plates 412 and 414, which comprise channels 416 and 418 that are used to transport fuel and/or waste products to and from first electrode 408 and second electrode 410. First electrode 408 and second electrode 410 are in conductive communication with electrical output connection $E_o$.

X.B. Polyelectrolyte

Polyelectrolytes can form a multitude of structures at various length scales in solution and can display a variety of properties not found in neutral polymers. The properties of these structures are controlled by many parameters, such as the inherent characteristics of the macromolecular backbone, charge types and locations, temperature, ionic strength, pH, and the like.

The presently disclosed copolymers of a fluorinated polydiene and a sulfonated polystyrene and the presently disclosed sulfonated cross-linked poly(1,3-cyclohexadiene) polymer provide a polyelectrolyte for use in, for example, a battery. More particularly, the presently disclosed sulfonated cross-linked poly(1,3-cyclohexadiene) polymer provides a well-defined polyelectrolyte with a lower flexibility than synthetic polyelectrolytes known in the art, due to the incorporation of the poly(1,3-cyclohexadiene) ring into the polymer backbone.

X.C. Fabric

In some embodiments, the presently disclosed subject matter provides a fabric, which in some embodiments comprises a barrier fabric, comprising the presently disclosed copolymers of fluorinated polydienes and sulfonated polystyrene and, in some embodiments, the presently disclosed cross-linked poly(1,3-cyclohexadiene (PCHD) polymers.

Such materials can be used as a barrier fabric, for example for use as breathable chemical-biological protective barrier clothing to protect military personnel, emergency response teams, industrial and/or agricultural workers, and healthcare professionals from chemical and/or biological agents, including hazardous and/or toxic chemicals and microorganisms, such as, but not limited to, chemical-biological warfare agents, viruses, bacteria, blood-borne pathogens, air-borne pathogens, industrial chemicals, and agricultural chemicals, in liquid, vapor, and aerosol forms. Further, such materials allow perspiration products to escape from, for example, a body, while preventing the penetration and/or transport of the aforementioned hazardous and/or toxic materials.

Further, in some embodiments, such barrier fabric can be used to protect agricultural products, including living and cultivated vegetative products, from, for example, exposure to natural pathogens, such as fungi, chemical and/or biological pathogens, and frost. In some embodiments, such barrier fabric can be used as a "weed barrier," which, for example, impedes the growth of undesired vegetative species, while retaining moisture in the soil.

X.D. Sol-Gel Templates

Sol-gel syntheses can be used to produce a variety of inorganic networks from silicon or metal alkoxide monomer precursors. In a typical sol-gel synthesis, a soluble precursor molecule, e.g., a metal alkoxide, is hydrolyzed to form a dispersion of colloidal particles (the sol). Further reaction causes bonds to form between the sol particles resulting in an infinite network of particles in a continuous liquid phase (the gel). The gel typically is then heated to yield the desired materials. The precursors for synthesizing these colloids typically comprise a metal or metalloid element surrounded by a reactive ligand. Metal alkoxides are particularly useful in sol-gel syntheses because they readily react with water. The most commonly used alkoxides are the alkoxysilanes, such as tetramethoxy silane and tetraethoxysilane. Other alkoxides, such as aluminates, titanates, and borates also are commonly used in sol-gel processes.

Membranes, such as porous alumina membranes and etched polymeric membranes, can be used as templates for sol-gel syntheses of, for example, micro- and nanostructures. As provided hereinabove in section IX, in some embodiments of the presently disclosed subject matter, phase-separated ionomers, such as those described herein, can act as templates for sol-gel polymerizations of metal alkoxides to generate nanostructured membranes.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing. from the scope of the presently disclosed subject matter.

Example 1

Synthesis of Copolymers

Unless otherwise noted, polymers were synthesized under an inert atmosphere. High vacuum techniques were sometimes employed and all solvents and monomers were purified according to anionic polymerization standards as described in the literature. See Hadjichristidis, N., et al., *J. Polym. Sci., Polym. Chem. Ed.,* 38, 3211 (2000). A difunctional initiator DLI was synthesized by the 2-fold addition of sec-butyllithium to 1,3-bis(1-phenylethenyl)benzene as reported previously (Uhrig, D. and Mays, J., *Macromolecules,* 35, 7182 (2002) and Tung, L. H., and Lo, T.Y.-S., *Macromolecules,* 27, 2219 (1994)) and stored as a 0.1 M solution in benzene. Prior to use, styrene monomer was distilled from calcium hydride under vacuum and stored at −20° C. under pressurized argon. Isoprene monomer was distilled from calcium hydride, and then distilled from 1.0 M dibutylmagnesium solution just before use. 1,3-Cyclohexadiene (1,3-CHD, Aldrich, 97%) was cleaned by treatment over $CaH_2$, sodium mirror (three times), and finally n-BuLi or $MgBu_2$.

Example 1.1

Synthesis of an Isoprene-Styrene-Isoprene (ISI) Triblock Copolymer

A 250 mL round bottom flask with a magnetic stir bar was dried in a 150° C. oven over 24 hours, then sealed with a septum and purged/cooled with argon. Cyclohexane (150 mL) was cannulated into the flask, followed by 2.2 mL (0.22 mmol) DLi difunctional initiator and 1.2 mL (14.8 mmol) THF. The resulting mixture was stirred for 30 minutes. Styrene monomer (2.0 mL, 17.4 mmol) was charged into the flask and polymerized at room temperature for 2 hours. Then, isoprene monomer (10.0 mL, 76.9 mmol) was charged into the flask and the flask was warmed to 50° C. The resulting mixture was stirred at room temperature overnight. The polymerization was terminated with degassed methanol, and the ISI triblock copolymer was collected by precipitation in methanol containing 0.2% BHT. Solvent/nonsolvent (toluene/methanol) fractionation was used to remove the diblock contaminants.

Example 1.2

Synthesis of a PS-PCHD Diblock Copolymer

PS-PCHD diblocks are prepared by either polymerizing 1,3-CHD first, followed by addition of styrene, or by polymerizing styrene first, followed by addition of 1,3-CHD. In a typical experiment, about 85 mL purified benzene was distilled into an evacuated reactor with attached ampoules containing all the necessary purified reagents. The reactor was removed from the vacuum line by heat-sealing after degassing. A 5.5 mL aliquot of sec-BuLi ($9.7 \times 10^{-5}$ mmol/mL in hexanes) was added followed by 2.3 g (0.022 mol) styrene. The polymerization started right away (as evidenced by a deep red color) and was allowed to continue for 6 hours before taking an aliquot (approximately 1 mL) for characterization. SEC and MALDI-TOF-MS results indicated a molecular weight of 4.52 kg/mol with a polydispersity of 1.08. About 2.5 mL of DABCO ($3.2 \times 10^{-4}$ mol/mL in benzene) was introduced into the reactor through a break-seal. After stirring about 5 minutes at room temperature, 6.4 g (0.08 mol) of 1,3-CHD was added from another ampoule. The solution turned golden yellow and was allowed to continue to polymerize for another 6 hours before the reaction was terminated with degassed methanol. The final product had a weight-average molecular weight (Mw) of 18.6 kg/mol (as indicated by MALLS), a number-average molecular weight (Mn) of 15.4 kg/mol (from MALDI-TOF analysis), a polydispersity (Mw/Mn) of 1.03, and a composition of PCHD with 66.0 wt % (as determined by NMR).

Example 1.3

Synthesis of Multigraft Copolymers

Comb Synthesis. An all-glass linking reactor was charged with approximately 2 mL of $MeSiCl_3$ in a small quantity of benzene. An approximately 5% w/v solution of PSLi in benzene was added to the silane so that the concentration of silane versus the concentration of carbon-lithium bonds, [silane]/[CLi],=100 while the reactor contents were stirred briskly in a 0° C. bath. The solution was allowed to warm to room temperature following the addition.

The contents of the reactor were distilled until the solution was too viscous to stir. Fresh benzene was added to make an approximately 10% w/v solution, and the contents were well mixed. This sequence was repeated twice more. The reactor was then left open to a high vacuum at room temperature for one week. Finally, benzene was added to make an approximately 3% w/v solution.

LiPILi was prepared as an approximately 3% w/v solution in benzene, initiated from DLI in the presence of sec-BuOLi ([COLi]/[CLi]=7). The LiPILi solution and the $(PS)MeSiCl_2$ from the linking reactor were adjusted to a stoichiometric ratio of [CLi]/[SiCl]=1.2, and the solutions were mixed. After 1 day, several milliliters of THF were added (approximately 0.5% v/v of the finally resulting solution; THF/Li=100).

Centipede Synthesis. An all-glass linking reactor was charged with 0.200 mmol of $SiCl_4$ in a small quantity of hexane and benzene. An approximately 3% w/v solution of PSLi was incrementally added to the silane. The first addition was made such that approximately 0.27 mmol of PSLi was added quickly to the chilled reactor (0° C. bath, colder than the flask of PSLi at 20° C.) with brisk stirring. After the first addition was made, the reactor was allowed to warm slowly to 20° C. (isothermic with the flask of PSLi), and further dropwise additions of PSLi were made. The progress of the linking reaction was monitored by removing small aliquots from the reactor and analyzing them with SEC. After approximately 2 equivalents of PSLi (approximately 0.40 mmol) had been added to the reactor, and more importantly the end point was judged by SEC, the titration was stopped.

An approximately 3% w/v solution of LiPILi in benzene and the $(PS)_2SiCl_2$ in the linking reactor were mixed in a stoichiometric ratio of [CLi]/[SiCl]=1.2. After 1 day THF was added (approximately 0.5% v/v of the finally resulting solution; THF/Li=100).

Barbwire Synthesis. An all-glass linking reactor was charged with 0.200 mmol of 1,6-bis(trichlorosilyl)hexane (hexachlorosilane) in a small quantity of hexane and benzene. An approximately 3% w/v solution of PSLi was incrementally added to the silane. The first addition was made such that approximately 2 equivalents (approximately 0.40 mmol) was added to the reactor. After the first addition, approximately 0.5 mL of THF was slowly distilled into the reactor (less than 0.5% v/v of the resultant linking solution; THF/Li=30). Further additions were made slowly to a calculated (stoichiometry of reagents and concentration of PSLi) stopping point of approximately 4.3 equivalents of PSLi (approximately 0.87 mmol). The progress of the linking reaction was monitored by removing small aliquots from the reactor and analyzing them via SEC. It was noticed that after addition of beyond approximately 3.7 equivalents of PSLi, the color in the linking reactor steadily grew more intensely golden.

An approximately 3% w/v solution of LiPILi in benzene and the contents of the linking reactor were mixed in a stoichiometric ratio of [CLi]/[SiCl]=1.2. After 1 day THF was added (approximately 0.5% v/v of the finally resulting solution; THF/Li=100).

Workup and Fractionation. The linking solutions were permitted to react for 3 weeks before quenching. The raw final polymers were stabilized with BHT and precipitated with a large excess of methanol. Fractionation was performed using toluene/methanol as the solvent/nonsolvent pair.

Additional details for the synthesis of the presently disclosed poly(isoprene-graft-styrene) copolymers are provided in Uhrig, D., and Mays, J. W., *Macromolecules*, 35, 7182 (2002), the disclosure of which is incorporated herein by reference in its entirety.

Example 1.4

Synthesis of Statistical Copolymers of 1,3-Cyclohexadiene and α-Methylstyrene

The general procedure for the synthesis of statistical copolymers of 1,3-cyclohexadiene and α-methylstyrene (aMS) is provided hereinabove in Scheme 2. Also as shown in Scheme 3, the polycyclohexadiene (PCHD) units in the copolymer are fluorinated using difluorocarbene, followed by sulfonation of PαMS.

Example 2

Fluorination and Sulfonation Procedures

Example 2.1

General Considerations

Fluorination of polydienes by generation of difluorocarbene has been reported by Cais, R. B., et al., *Macromolecules*, 19, 595 (1986), using $PhHgCF_3$ as the fluorine source, and by Thomson, M. W., *Macromolecules*, 22, 481 (1989), via irradiation of chlorofluorocarbons. Further, Ren, Y., et al., *J. Am. Chem. Soc.*, 120, 6830 (1998), have reported a facile method for fluorination of polydienes based upon difluorocarbene addition. This reaction employs the relatively inexpensive hexafluoropropylene oxide as a reagent and does not lead to chain scission or crosslinking.

An example of the post-polymerization fluorination of polybutadiene (PBD) and sulfonation of polystyrene (PS) in a PS-PBD block copolymer is provided hereinabove in Scheme 1. After fluorination of the polydiene, e.g., polybutadiene, component, the polystyrene segments can be sulfonated using reagents, such as acetyl sulfate or sulfur trioxide, to form poly(styrene sulfonic acid) (PSS).

Example 2.2

Fluorination of ISI Triblock Copolymer

The ISI triblock copolymer (3.0 g, 35 mmol double bond content) and 0.4 g BHT was dissolved in 120 mL pretreated cyclohexane and charged into a Parr reactor. The Parr reactor was purged with argon and cooled with liquid nitrogen. Hexafluoropropylene oxide (HFPO, 98 g, 590 mmol) was transferred into the Parr reactor from a tank using a regulator and tubing. The Parr reactor was warmed to 50° C. and stirred for 30 min. The Parr reactor was heated to 180° C. and slowly stirred for an additional 20 hours. The pressure was released slowly through a sodium hydroxide solution after the reactor was cooled to room temperature. The solid material in the Parr reactor was dissolved in chloroform, un-dissolved material was removed by filtration, and the filtered solution was precipitated with methanol. The obtained precipitate was dried under vacuum at room temperature.

Proton NMR indicated the quantitative fluorination of the polyisoprene block. GPC characterization revealed that the average molecular weight of the triblock copolymer had changed from 43,900 g/mol before fluorination to 22,600 g/mol after fluorination, and the polydispersity index (PDI) went from 1.23 to 1.55.

Example 2.3

Sulfonation of Fluorinated ISI Triblock Copolymer

Fluorinated ISI triblock copolymer (1.8 g) was dissolved in 20 mL dichloroethane (DCE). Sulfuric acid (2.5 mL) and acetic anhydride (3.7 mL) were mixed in a flask, which was then cooled in an ice bath. The sulfuric acid/acetic anhydride mixture was added drop-wise through an addition funnel into the polymer solution at room temperature. The resulting solution was stirred at room temperature for 20 hours. DCE was removed by rotary evaporation. The remaining residue was dissolved in 50 mL distilled water and then titrated to a pH of about 7 with 10% sodium hydroxide solution. The neutralized solution was purified by dialysis in distilled water several times (MW cutoff of the dialysis tube=1,000 g/mol). The water was removed by rotary evaporation. The remaining dark-brown material was dried under vacuum at room temperature.

Example 3

Molecular Characterization of the Synthetic Products

Example 3.1

Characterization of Linear and Branched Styrene/Diene Copolymers

Samples of all polymer segments are taken during the reactions (whenever possible) to allow for the independent characterization of the precursor segments and the final block copolymers by absolute molecular weight methods such as osmometry, matrix assisted laser desorption ionization time-of-flight mass spectrometry (MALDI-TOF-MS), and light scattering, as well as by gel permeation chromatography (GPC), nuclear magnetic resonance (NMR) spectrometry, and infrared (IR) spectrometry.

Example 3.2

Characterization of Materials After Fluorination and Sulfonation

After the fluorination reactions, the polymer is isolated and characterized by $^1H$ and $^{19}F$ NMR and GPC to check for complete reaction of the diene and to assure that degradation has not occurred. GPC at temperatures up to 220° C. is carried out, with light scattering detection, even for specimens exhibiting crystallinity at lower temperatures. After sulfonation, the products are characterized for extent of sulfonation by elemental analysis. The sulfonation conditions chosen have been shown to yield little if any degradation of precursor polymers. Thus, in some embodiments, the molecular architectures and degrees of polymerization should not be altered from their precursor states.

Example 3.3

Characterization of Conformational Asymmetry of Fluorinated Polydienes and Partially Sulfonated Polystyrene Light scattering and viscometry experiments are used to estimate persistence lengths of the individual polymer segments to calculate conformational asymmetry. Bulk densities are measured for fluorinated polydienes and for sulfonated polystyrenes using standard ASTM methods.

Example 4

Preparation of a Crosslinked Poly(1,3-cyclohexadiene) Membrane

Example 4.1

Synthesis of Linear Poly(1.3-cyclohexadiene) (PCHD)

Poly(1,3-cyclohexadiene) (PCHD) was synthesized under inert gas atmosphere. The materials used in the synthesis of PCHD were prepared as follows. 1,3-cyclohexadiene monomer was purified by stirring with fine-grounded calcium hydride over 24 hours then distilled under argon. 1,4-Diazabicyclo[2,2,2]ocatane (DABCO) was sublimed under vacuum then diluted in benzene. Cyclohexane was stirred with sulfuric acid for 24 hours and then separated into a cyclohexane fraction. The cyclohexane was washed with water, 10% sodium hydroxide solution, water again, dried with calcium chloride, then distilled from sodium metal and stored under argon. Benzene was purified via the same procedure as cyclohexane. Sec-Butyl lithium (sec-BuLi) (Aldrich, 1.4 M) was used as received.

A typical procedure for synthesizing PCHD is as follows. A 250 mL round bottom flask with a magnetic stir bar was dried in an oven heated to 150° C. for 24 hours, then sealed with a septum and purged/cooled with argon flow. 100 mL of pretreated benzene (or cyclohexane) was charged through a double tipped needle. 1,3-Cyclohexdiene monomer (10 mL, 0.105 mmol) was charged into the flask. DABCO in benzene (approximately 1.7 M, 1.5 mL, 2.55 mmol) was charged into the flask by using a syringe. The mixture was titrated with several drops of sec-BuLi to a very pale color and then the desired amount of sec-BuLi (0.6 mL, 0.84 mmol) was immediately injected. The mixture was stirred at room temperature for 3-4 hours, then terminated with several drops of degassed methanol. The polymer was collected by precipitating in methanol containing 0.2% BHT. The obtained polymer was dried under vacuum at room temperature and then stored at −20° C.

Example 4.2

Synthesis of a Cross-Linked Poly(1.3-cyclohexadiene) (PCHD) Membrane

A typical procedure for the synthesis of a cross-linked poly(1,3-cyclohexadiene) (PCHD) membrane is as follows. In a 100-mL round bottom flask with a magnetic stir bar, 3 g of PCHD (37.5 mmol double bond units) was dissolved in 20 mL of toluene and then the desired amount of sulfur monochloride (0.15 mL, 1.87 mmol) was added. The ratio of PCHD repeat units to sulfur monochloride was controlled around 20:1 mol/mol. The mixture was stirred until the viscosity of the mixture increased. The mixture was pulled out onto a Teflon disc (10 cm in diameter) before forming a gel. Most of the solvent was evaporated under nitrogen flow to form the cross-linked membrane. After the membrane was tough enough to handle, but was not totally dry, the membrane was peeled off carefully.

Example 4.3

Synthesis of an Aromatized Cross-Linked Poly(1.3-cyclohexadiene (PCHD) Membrane

A typical procedure for the synthesis of an aromatized cross-linked poly(1,3-cyclohexadiene (PCHD) membrane is as follows. The cross-linked PCHD membrane was cut into a 2.5'×2.5' square sheet and placed into a three necked, 1,000-mL reaction vessel (diameter 10 cm) containing a magnetic stir bar and a customized porous ceramic supporter. The membrane was placed flat on the supporter. Xylene was added into the reaction vessel to submerge the PCHD membrane. The desired amount of p-chloranil was dissolved into the xylene then the temperature was raised to 130° C. The reaction was performed 24 hours under nitrogen protection. The obtained membrane was washed with different solvents (isopropanol, THF, etc) to remove the p-chloranil. The membrane was carefully dried for further use.

Example 4.4

Sulfonation of an Aromatized/Non-Aromatized Cross-Linked Poly(1.3-cyclohexadiene) (PCHD) Membrane A typical procedure for the sulfonation of an aromatized/non-aromatized cross-linked poly(1,3-cyclohexadiene) (PCHD) membrane is reported as follows. The PCHD membrane (aromatized or non-aromatized) was placed flat on a ceramic supporter in a three-necked, 1,000-ml reaction vessel (diameter 10 cm) containing a magnetic stir bar. Dichloroethane was added into the vessel to submerge the membrane. Sulfuric acid and acetic anhydride mixture in a 1:1.5 v/v ratio was added drop wise into the vessel. The reactions were kept going up to 24 hours, and the temperature varied for different sulfonation reactions from room temperature to 100° C. to vary the degree of sulfonation. The obtained membrane was washed carefully with distilled water, then stored in a plastic bag containing a small amount of moisture.

Example 4.5

Characterization of the Cross-Linked Poly(1.3-cyclohexadiene) (PCHD) Membranes

The molecular weights and polydispersities of the linear PCHD precursors for cross-linking were characterized via gel permeation chromatography (GPC). The molecular weights of all the linear samples are about 10,000 g/mol, with a polydispersity of about 1.1-1.2.

Proton NMR shows that the linear PCHD samples have a highly 1,4 microstructure.

Figure 5:
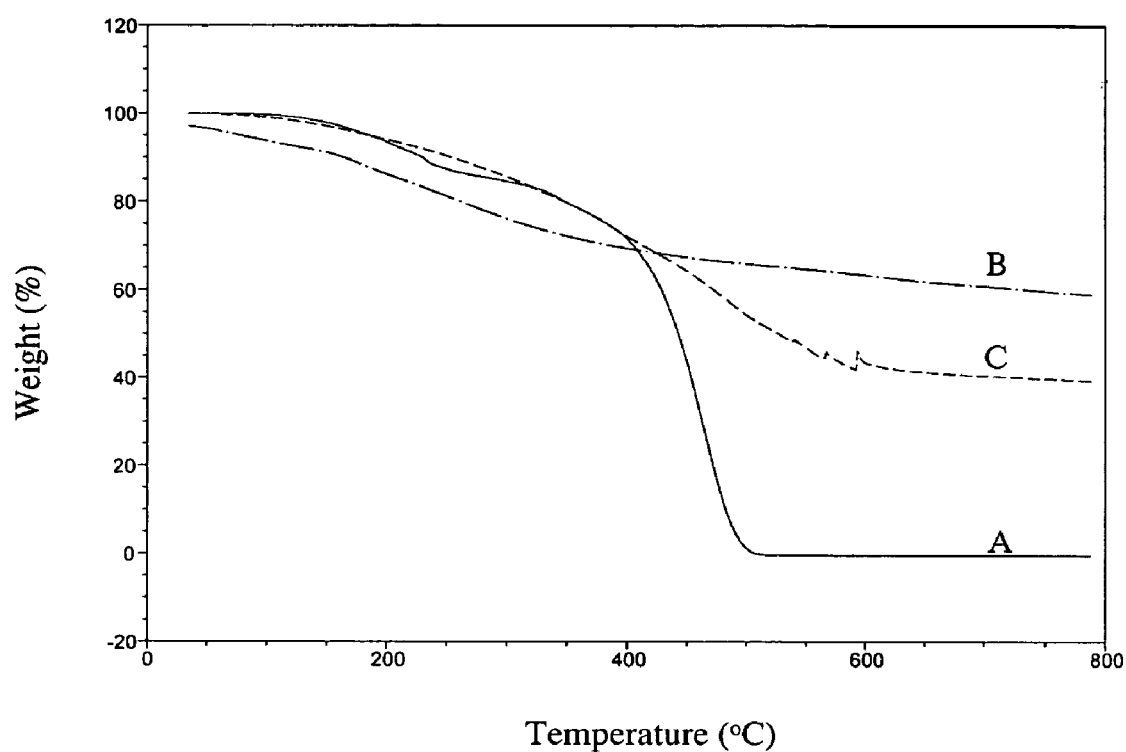
FIG. 5 is a plot of the weight percent versus temperature for a presently disclosed cross-linked poly(1,3-cyclohexadiene) (PCHD) membrane. Line A represents the thermal analysis of a cross-linked PCHD membrane. Line B represents the thermal analysis of a cross-linked PCHD membrane after aromatization. Line C represents the thermal analysis of a cross-linked PCHD membrane after aromatization and sulfonation.

The thermal stability of the presently disclosed cross-linked PCHD membrane, aromatized PCHD membrane, and sulfonated PCHD membrane with or without aromatization were studied via DSC and TGA. An example of the thermal analysis of a presently disclosed cross-linked PCHD membrane is provided in FIG. 5.

Figure 6A:
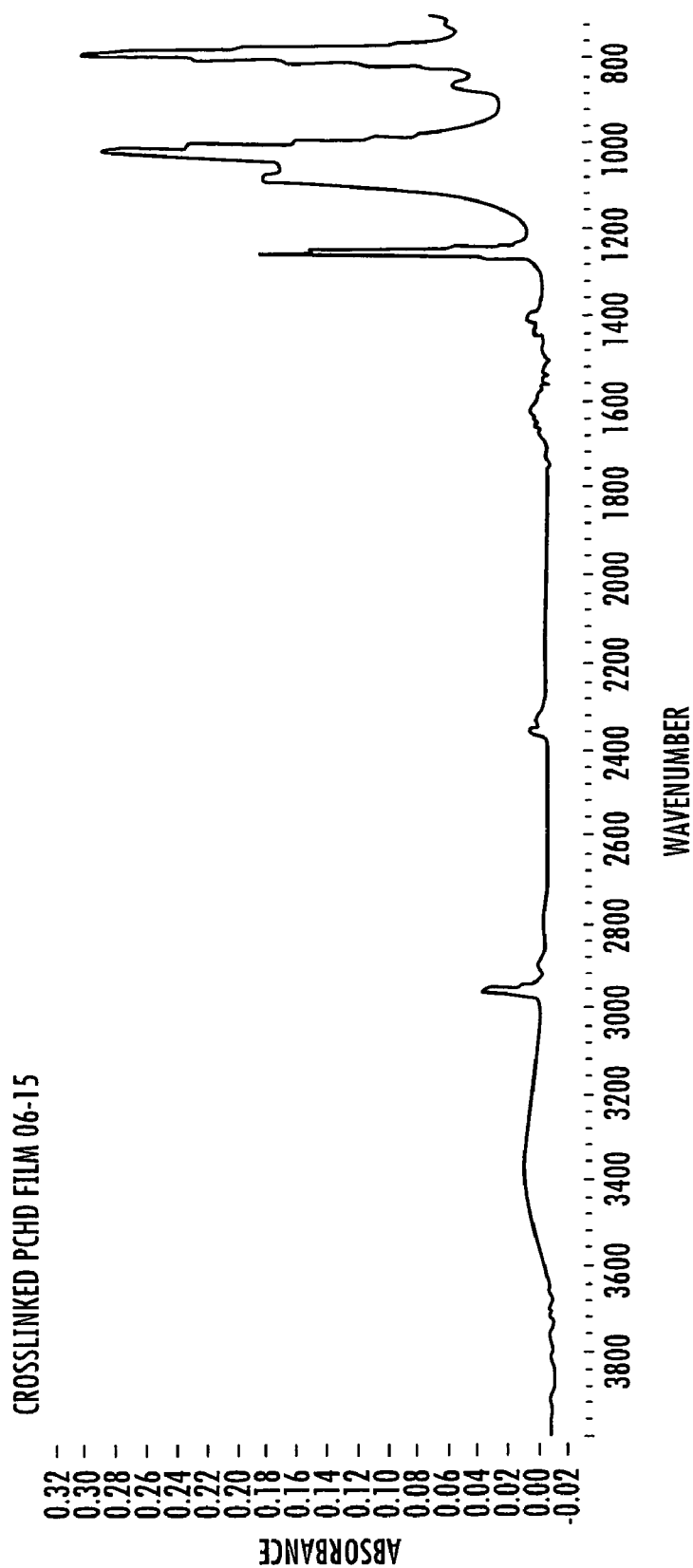
FIGS. 6A and 6B are representative Fourier transform infrared (FTIR) spectra of a presently disclosed cross-linked poly(1,3-cyclohexadiene) (PCHD) membrane.
Figure 6B:
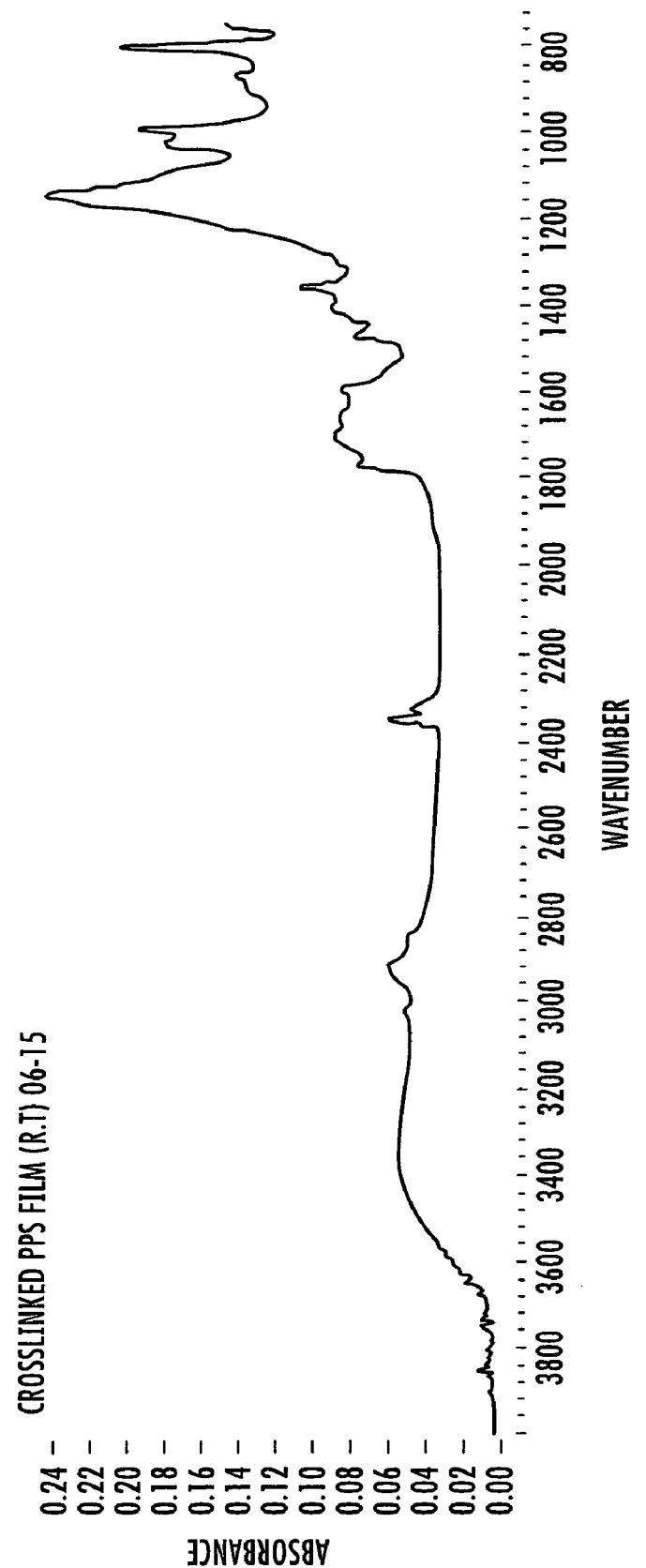

Fourier transform infrared (FTIR) spectrometry was used to investigate the chemical change on the surface of the presently disclosed cross-linked PCHD membranes before and after aromatization and sulfonation. FIG. 6A shows a representative FTIR spectrum of a presently disclosed cross-linked PCHD membrane and FIG. 6B shows a representative FTIR spectrum of a presently disclosed sulfonated, aromatized cross-linked PCHD membrane.

Figure 7A:
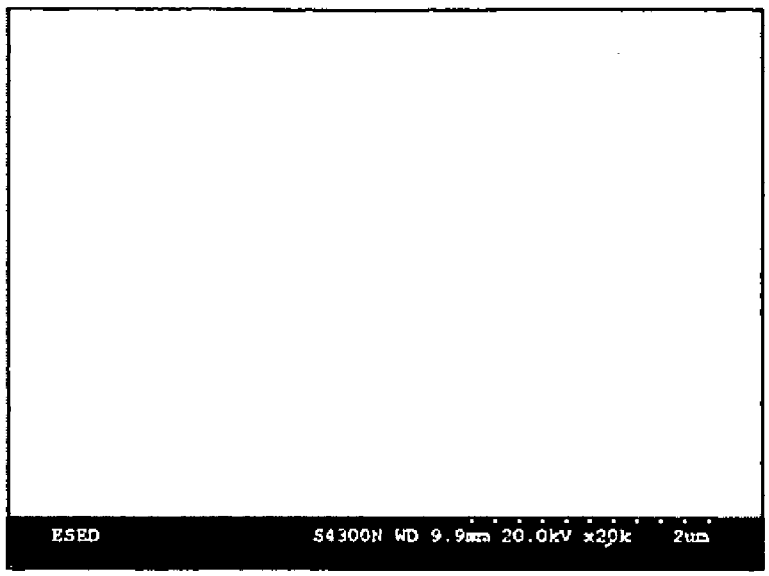
FIGS. 7A and 7B are representative scanning electron microscopy (SEM) micrographs of a presently disclosed cross-linked poly(1,3-cyclohexadiene) (PCHD) membrane.
Figure 7B:
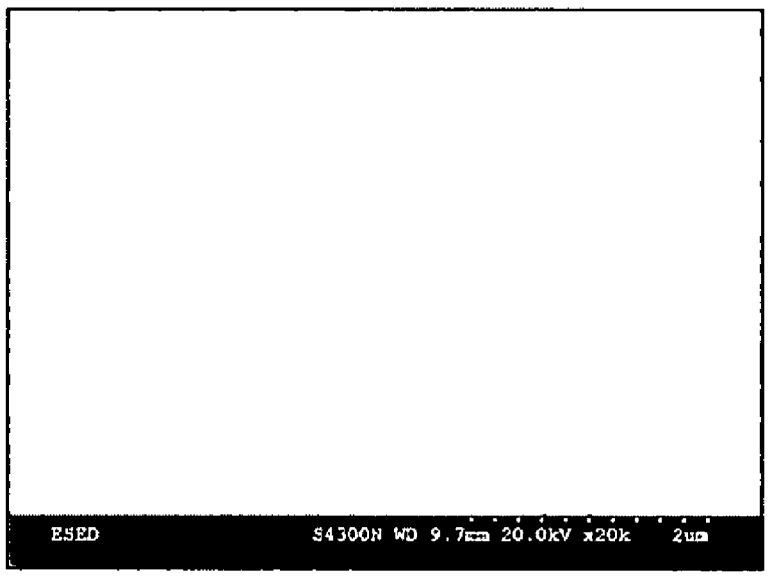

Scanning electron microscopy (SEM) was used to study the surface defects (cracks) of the cross-linked PCHD membranes before and after aromatization and sulfonation. FIG. 7A shows an SEM micrograph of a cross-linked PCHD membrane before sulfonation and FIG. 7B shows an SEM micrograph of a cross-linked PCHD membrane after sulfonation.

The degree of sulfonation of all sulfonated samples was characterized based on the elemental analysis that focused on carbon and sulfur contents to all membrane samples before and after sulfonation.

The water uptake of sulfonated membranes was characterized by the weight difference between a thoroughly dried membrane and a thoroughly moisturized membrane.

Example 5

General Methods of Morphological Characterization

Morphological characterization is a key step in any effort to relate nanoscale structure to properties. In some embodiments, the presently disclosed subject matter seeks to determine how fluorination and subsequent sulfonation affect the morphological self-assembly of the materials. To address this question, the morphology of the initial PS-PBD material is compared to the fluorinated PS-FPBD material and finally to the fluorinated and sulfonated PSS-FPBD. Morphological characterization of these materials utilizes real-space, transmission electron microscope (TEM) imaging and reciprocal-space small angle scattering (SAXS and/or SANS) techniques. Morphological study of the PS-PBD materials utilizes established techniques and protocols.

The following procedure is a representative method by which the morphology of a block or graft copolymer is evaluated. This procedure is the same general approach that has been employed in previous block copolymer research on PS-polydiene materials to produce a sample representative of the equilibrium morphology, and to evaluate that morphology. See Gido. S. P., et al., *Macromolecules*, 29, 7022 (1996); Gido. S. P., et al., *Macromolecules*, 30, 6771 (1997); Pochan. D. J., et al., *Macromolecules*, 29, 5091 (1996); Pochan. D. J., et al., *J. Polymer Sci.: Part B, Polymer Physics*, 35, 2629 (1997); Lee, C., et al., *J. Chem. Phys.*, 107, 6460 (1997); Lee, C., et al., *Macromolecules*, 30, 3732 (1997); Lee, C., et al., *Polymer*, 19, 4631 (1998); Xenidou. M., et al., *Macromolecules*, 31, 7659 (1998); Beyer, F. L., et al., *Macromolecules*, 30, 2373 (1997); Beyer. F. L., et al., *Macromolecules*, 32, 6604 (1999); Beyer. F. L., et al., *J. Polymer Sci.: Part B, Polymer Physics*, 37, 3392 (1999); Beyer. F. L., et al., *Macromolecules*, 33, 2039 (2000); Burgaz. E., et al., *Macromolecules*, 33, 8739-8745 (2000); Alward, D. B., et al., *Macromolecules*, 19, 215 (1986); Thomas, B. L., et al., *Macromolecules*, 20, 2934 (1987); Thomas, B. L., *Macromolecules*, 19, 2197 (1986); Gido, S. P., et al., *Macromolecules*, 26, 4506 (1993); and Winey, K. I., et al., *J. Chem. Phys.*, 95, 9367 (1991).

Solid films of the block or graft copolymer material, approximately 1- to 3-mm thick, are cast from solution. Toluene is the standard non-preferential solvent for polystyrene (PS) and polyisoprene (PI). Casting from other solvents that are selective for either PS or PI can result in shifts in morphology away from that which the molecule itself would prefer. The degree of long-range order in the samples can then be increased by thermal annealing at about 120° C. These casting and annealing conditions have been found to promote self-assembly of well-ordered, nanostructured morphologies in previous studies of graft copolymers.

After annealing, ultrathin sections approximately 30-80 nm thick are prepared for TEM observation by cryoultramicrotoming. The sections of PS-PBD materials are stained in $OsO_4$ vapors for about four hours to react with the PBD block double bonds, rendering these blocks dark in TEM imaging via mass thickness contrast. See Kato, K., *Polymer Engineering and Science*, 8, 38 (1967); and Kato, K., *J. Polymer Sci., B* 4, 35 (1966).

In the fluorinated PS-FPBD materials, the fluorine atoms attached to the PBD blocks use up the unsaturated sites, thus preventing staining of this block with $OsO_4$. The fluorine itself is not a heavy enough element to enhance contrast in TEM. The PS block of the fluorinated samples can be stained with $RuO_4$. Thus, stained fluorinated samples will have opposite contrast to the original PS-PBD, i.e., dark stained PS blocks and light FPBD blocks. In the sulfonated and fluorinated PSS-FPBD materials, staining of the PSS block with $RuO_4$ is possible for a number of reasons. In most cases, the PSS block will not be fully sulfonated and thus unmodified PS monomers will be present to react with the stain. Additionally, the sulfonated PSS monomers might still retain their reactivity with $RuO_4$. Finally, the TEM imaging contrast in the PSS-FPBD materials can be enhanced by exchanging the counter ion of the sulfonate group, normally $Na^+$, for a heavier cation such as $Cs^+$. See Belloni. L., et al., *Chem, Phys.*, 119, 7560 (2003).

Small angle scattering experiments can be performed on all samples to accurately determine the lattice symmetries and spacings of the morphologies. Small angle X-ray scattering (SAXS) and small angle neutron scattering (SANS) can be used to study model graft copolymers. SAXS can be performed, for example, by using a rotating anode source and a two-dimensional area detector. The use of a heavy counterion for the PSS blocks enhances contrast in SANS experiments, but is not necessary to obtain good SANS results.

Further, many of the materials synthesized have deuterated PS blocks. This deuteration, produced by the use of fully deuterated d-PS monomer in the initial anion polymerization, is retained through post polymerization fluorination and sulfonation treatments. Deuteration allows SANS to be used to compare the morphologies of the PS-PBD, PS-FPBD, and PSS-FPBD without interference from chemical treatments or staining procedures.

Example 6

Vapor and Charge Transport Experiments

The investigation of the permeability of the materials to water vapor and methanol, as well as the efficiency of proton transport, is important for applications of the presently disclosed materials in fuel cells and in breathable barrier materials for chemical-biological protection. High water vapor permeability enhances the utility of the materials for breathable barrier applications, and the ability to hydrate the material also is necessary for the fuel cell membrane application. For fuel cell applications, it also is important that the materials limit methanol transport.

Accordingly, the presently disclosed the fluorinated and sulfonated block copolymers can be characterized by using the same sorption balance device and the same morphological analysis of connectivity and transport path tortuosity to investigate their water vapor and methanol transport properties. In the presently disclosed subject matter, it is the PSS domain connectivity that controls the properties. Of course, these transport properties also will be influenced by non-morphological chemical factors, such as degree of PS sulfonation. By developing data of the type shown in FIGS. 8 and 10 for inert gases, for water vapor and methanol, allows one to choose materials and morphologies to optimize materials for the desired applications.

A major factor controlling vapor or charge transport in the materials is the morphological connectivity of conductive sulfonated PS domains within the nonconductive fluorinated diene matrix. The effect of morphological connectivity on transport properties on model block and graft copolymers of PS and polydiene has been previously reported. See Laverdure, K. S. In *Chemical Engineering*; University of Massachusetts: Amherst, Mass., 2001.

In this previous work, the permeability of non-interacting gases such as $N_2$, Ar, $O_2$, and $CO_2$ in PS-polydiene materials was studied. In these materials, at room temperature, the rubbery polydiene microdomains are as much as 100 times more permeable to these gases than the glassy PS domains. Therefore, in morphologies, such as polydiene cylinders in a PS matrix or lamellar structures, the sample spanning connectivity or percolation paths in the polydiene domains control the transport behavior. See Csernica. J., et al., *Macromol-* ecules, 20, 2468 (1987); Csernica, J., et al., *Macromolecules*, 22,1493 (1989); Rein. D. H., et al., *Macromolecules*, 23, 4456 (1990); Kinning. D. J., et al., *Macromolecules*, 20,1129 (1987); Saxs. J. and Ottino. J. M., *Polymer Engineering and Science*, 23, 165 (1983); and Mohanty. K. K., et al., *Chemical Engineering Science*, 37,905 (1982).

Transport studies were carried out using a sorption balance device following the basic design described previously. See Kinning. D. J., et al., *Macromolecules*, 20,1129 (1987); and Saxs. J. and Ottino. J. M., *Polymer Engineering and Science*, 23, 165 (1983). By measuring mass uptake with time, diffusion coefficients, solubilities, and thus permeabilities can be obtained.

Figure 8:
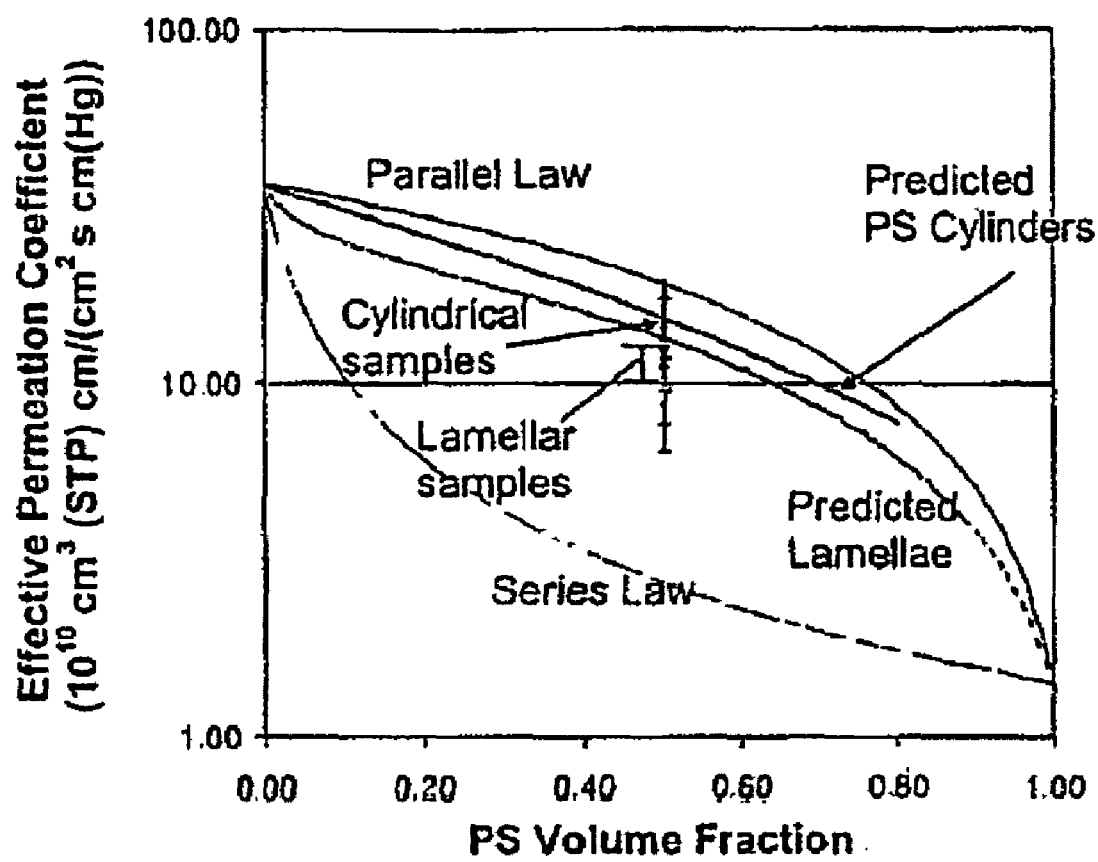
FIG. 8 is a diagram showing $O_2$ permeability as a function of morphology and volume fraction.

FIG. 8 provides experimental data from previous work showing the $O_2$ permeability of PS-polyisoprene block copolymers as a function of composition and morphology for lamellar and cylindrical samples both at 0.50 polyisoprene volume fraction. All the morphologies are bounded by the calculated envelope bounded by parallel law (upper) and series law (lower) transport. Additional studies focusing on lamellar morphologies showed transport dependences on morphological grain size and degree of grain orientation. See Laverdure. K. S. In *Chemical Engineering*; University of Massachusetts: Amherst, Mass., 2001.

Figure 9:
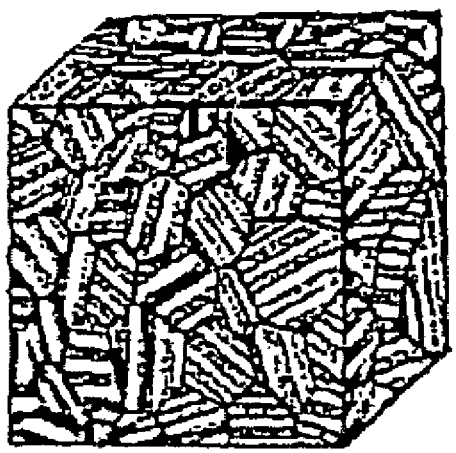
FIGS. 9A and 9B are schematic diagrams illustrating transport paths in small vs. large grain morphologies.
Figure 9:
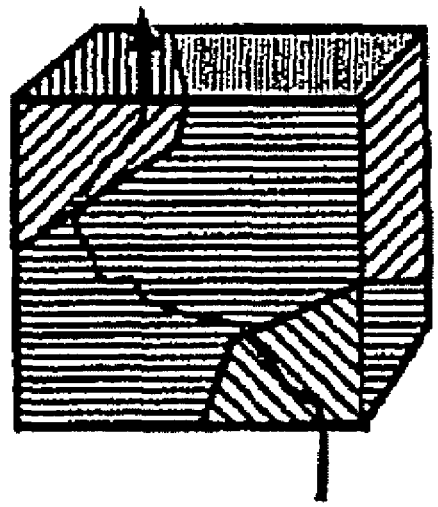

FIGS. 9A and 9B show a schematic comparison of possible transport pathways in lamellar materials with small isotropic grains (FIG. 9A) and large anisotropic grains (FIG. 9B). It is known that the boundaries between adjacent grains in FIGS. 9A and 9B allow for connectivity of conductive microdomains across the boundaries, and thus allow for ready transport from one grain into the next. See Gido, S. P., et al., *Macromolecules*, 26, 4506 (1993); Gido, S. P. and Thomas. B. L., *Macromolecules*, 27, 849 (1994); Gido. S. P. and Thomas. B. L., *Macromolecules*, 27, 6137 (1994); Gido. S. P. and Thomas, B. L., *Macromolecules*, 30, 3739 (1997); Burgaz. E. and Gido. S. P., *Macromolecules*, 33, 8739-8745 (2000); Matsen. M. W., *J. Chem. Phys.*, 107, 8110 (1997); Netz, R. R., et al., *Physical Review Letters*, 79, 1058 (1997); and Villain-Guillot. S., et al., *Physica A*, 249, 285 (1998).

Clearly the tortuosity of transport paths is potentially larger in samples with large grains oriented in a direction perpendicular to the direction of transport. Transport data from studies on the influence of morphology type as well as on grain size and degree of long range order can all be unified through the following result from percolation theory for the effective permeability, $P_{eff}$, of a composite of a conducting material and nonconducting obstacles: $P_{eff}=(\phi_c/T)P_c$; wherein $\phi_c$ and $P_c$ are the volume fraction and permeability of the conductive microphase, respectively. The effective permeability is inversely proportional to the tortuosity, T, of transport paths in the conductive domains.

Figure 10:
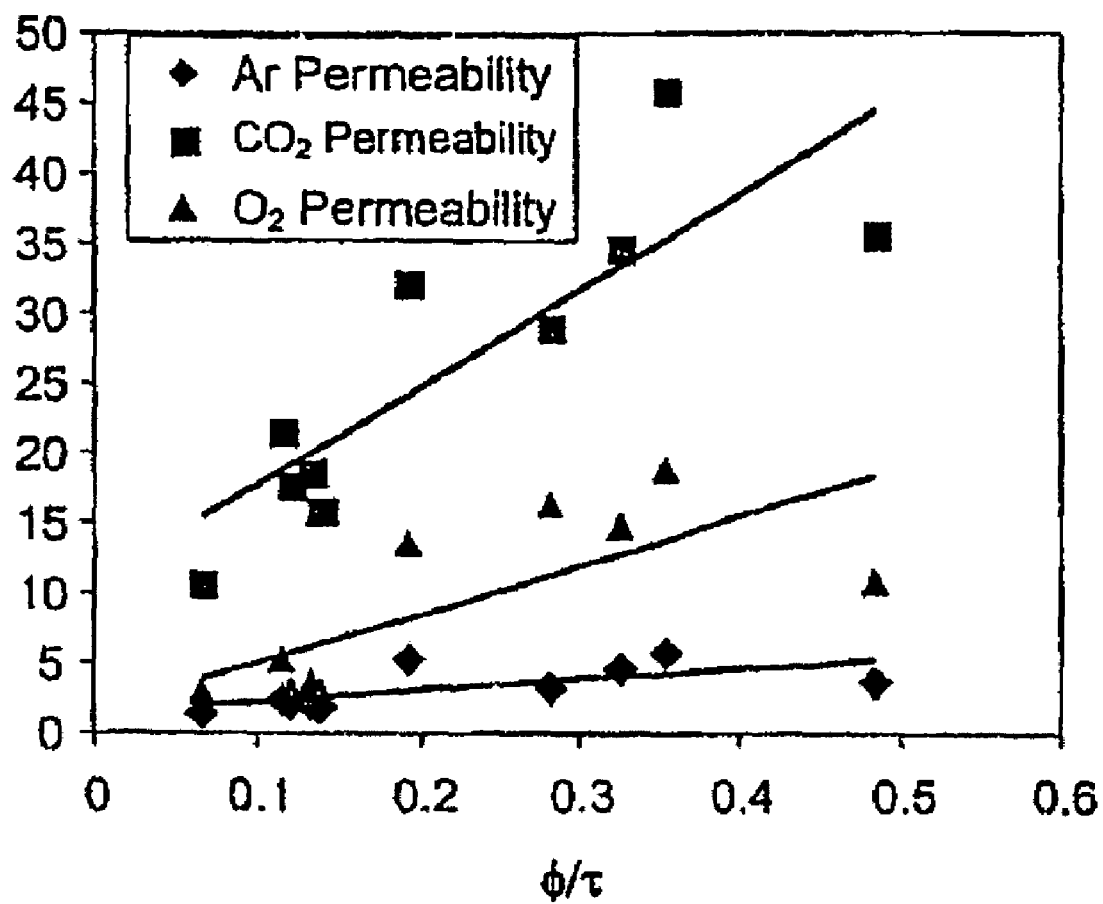
FIG. 10 is a graphical representation of gas permeability in polystyrene-polydiene block copolymers vs. $\phi_c/T$, wherein $\phi_c$ is the volume fraction of the conductive microphase and T is the tortuosity of transport paths in the conductive domains, wherein (♦) corresponds to the Argon (Ar) permeability (■); corresponds to the carbon dioxide ($CO_2$) permeability; and (▲) corresponds to the oxygen ($O_2$) permeability.

FIG. 10 shows all the permeability data for three gases obtained in previous studies of both morphology type and grain size and orientation. Measured effective material permeability is plotted vs. $\phi_c/T$ where $\phi_c$ is known from the polydiene volume fraction of the block copolymers and T is estimated from the TEM and SANS analysis of morphology, grain size, and degree of orientation. For the three gases studied, a linear relationship between permeability and $\phi_c/T$ is observed, with the slope giving the permeability of the polydiene domains to the gas used.

Accordingly, the presently disclosed fluorinated and sulfonated block copolymers can be characterized by using the same sorption balance device and the same morphological analysis of connectivity and transport path tortuosity to investigate their water vapor and methanol transport properties. In the presently disclosed subject matter, it is the PSS domain connectivity that controls the properties. Of course, these transport properties also are influenced by non-morphological chemical factors, such as degree of PS sulfonation.

Example 7

Mechanical Experiments

Previous work has related the molecular architecture, morphology, and mechanical properties of well-defined multigraft copolymers with the architectures shown in FIGS. 1A-1E: trifunctional combs, tetrafunctional centipedes, and hexafunctional barbwire. The general results of these studies are that, other things being equal (PS volume fraction and average number of grafts per molecule), increasing junction point functionality increases material strength and elasticity. And for a fixed PS volume fraction and junction point functionality, increasing the number of junction points per molecule increases the strength, strain at break, and elasticity. The best materials from these previous studies equaled the strength and exceeded the elasticity and strain at break performance of commercial thermoplastic elastomers, such as KRATON® and STYROFLEX® materials (BASF, Florham Park, N.J., United States of America). In the currently disclosed subject matter, the block and graft copolymer materials are mechanically evaluated after they have been fluorinated and sulfonated. Applications of the fluorinated and sulfonated materials as barrier materials for chemical-biological protection or as fuel cell membranes require good mechanical strength and toughness, and in the case of fuel cells good mechanical properties at elevated temperatures of between about 100° C. and 150° C.

Figure 11:
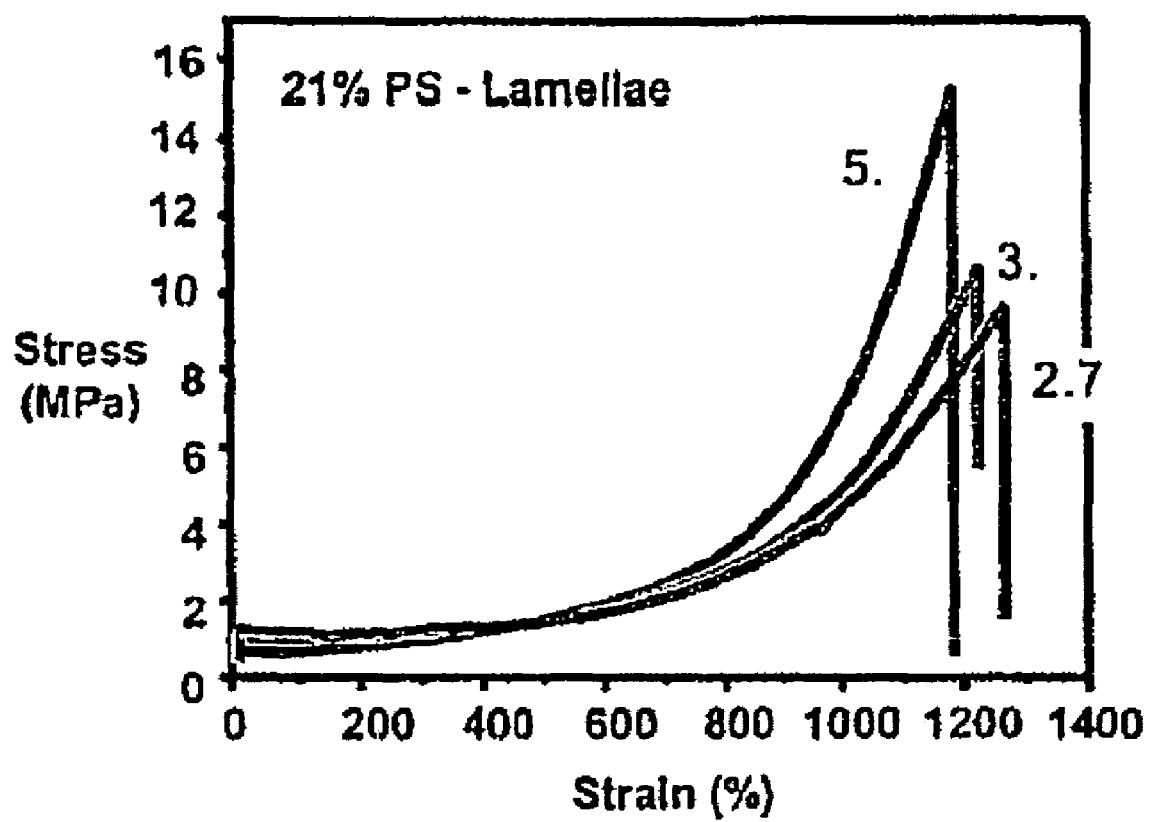
FIG. 11 is a graphical representation of stress vs. strain tensile curves for hexafunctional polystyrene-polyisoprene graft polymers with 21-vol % polystyrene and 2.7-, 3.6-, and 5.2-average number of branch points per molecule.

FIG. 11 shows a typical stress vs. strain curve based on previous data for PS-Polydiene based materials. These tests utilize a scaled down ASTM standard "dog bone" and obtain good testing statistics by reusing broken tensile specimens to produce new specimens for further testing. This is done by redissolving the broken dog bones in solution, casting and annealing new sample films from which new dog bones are cut. As a result of these procedures, each tensile test curve shown in FIG. 11 is the composite of 10 individual runs.

Figure 12:
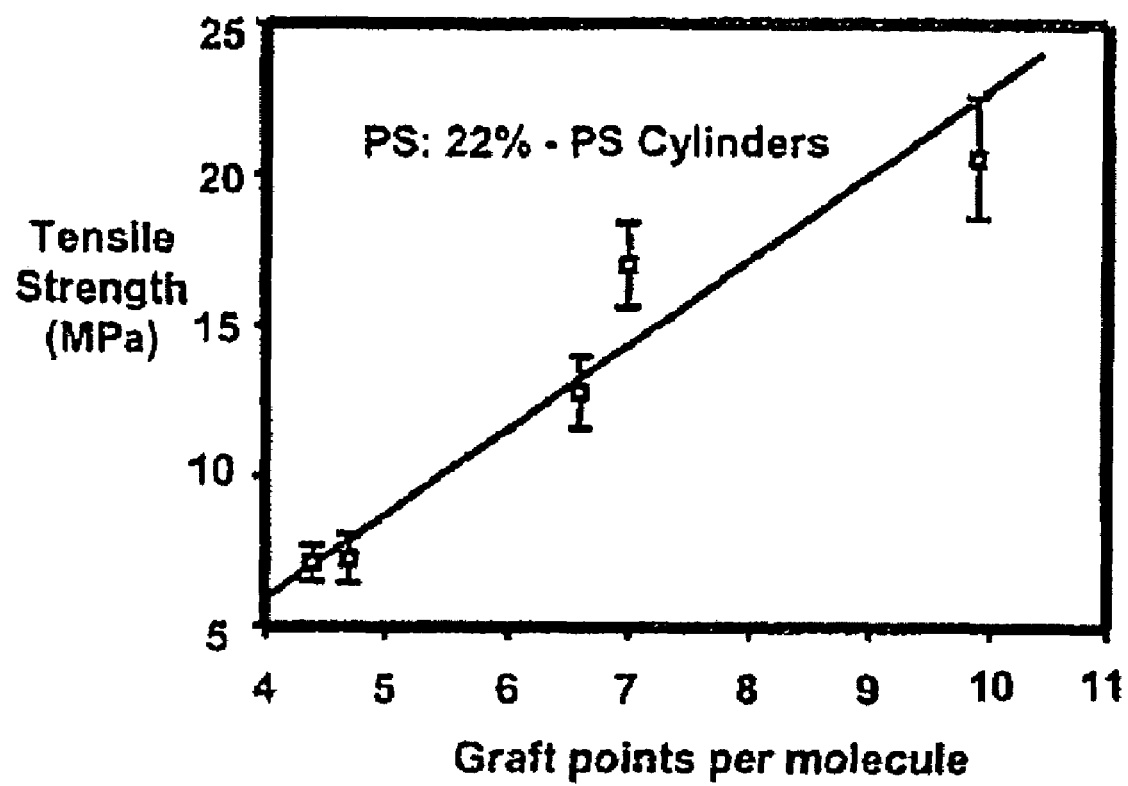
FIG. 12 is a graphical representation of tensile strength as a function of the number of branch points in a polystyrene-polyisoprene graft copolymer with tetrafunctional grafting and a polystyrene volume fraction of 0.22.
Figure 13:
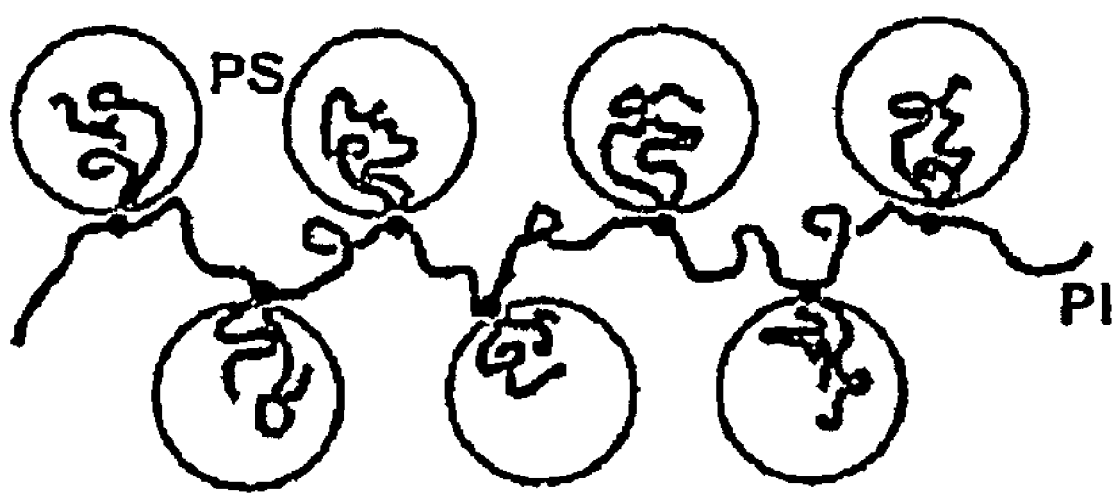
FIG. 13 is a schematic representation of microphase separation in a multigraft copolymer with tetrafunctional branch points.

FIG. 12 shows the dependence on the number of branch points per molecule of tensile strength for tetrafunctional centipede graft copolymers with polydiene backbones and PS grafts obtained from previous data. Each point on these curves results from the average of at least 10 individual tensile testing experiments. The PS volume fractions of these materials are about 0.22, in the range targeted for the presently disclosed graft copolymer cylinders. Increasing the number of junction points per molecule increases strength and also the elasticity in these highly elastomeric materials. Once fluorinated and sulfonated, materials of this type likely will be less elastic, but likely will retain some flexibility, as well as their excellent strength and toughness which results, as illustrated in FIG. 13, from the microphase separation of multiple grafts into a number of different microphase separated domains.

Figure 14:
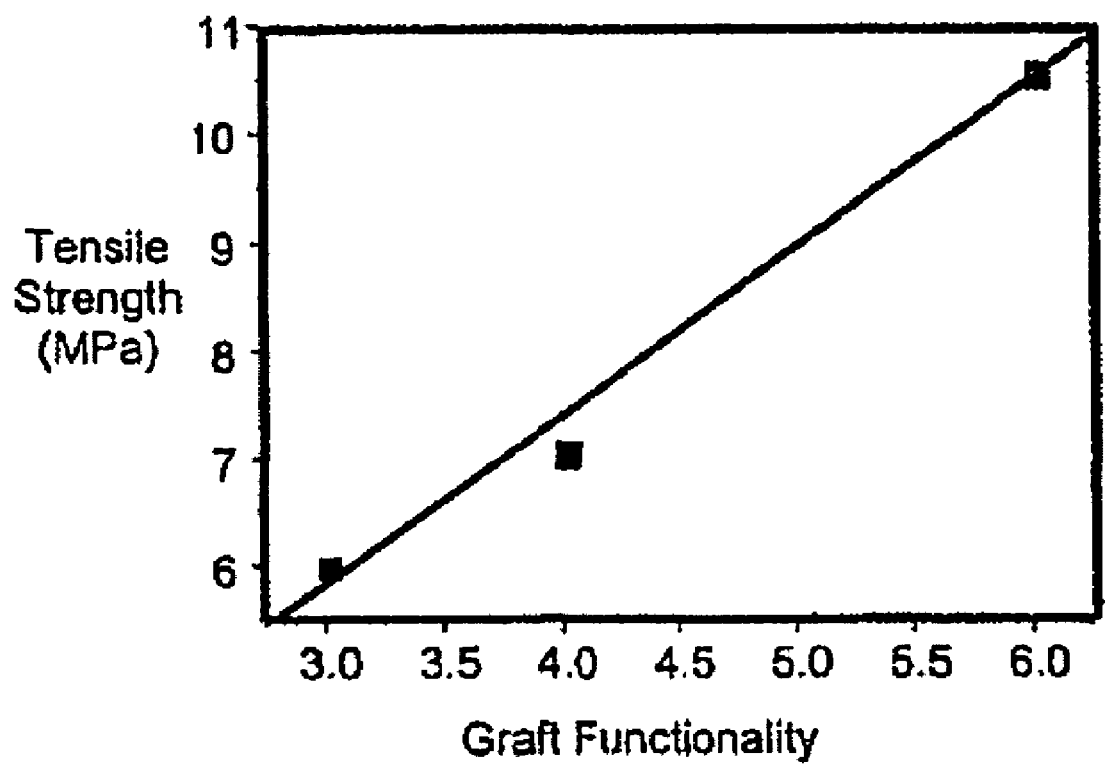
FIG. 14 is a graphical representation of tensile strength as a function of graft point functionality for samples with 22-vol % polystyrene and an average of four graft points per molecule.

FIG. 14 shows the increase in tensile strength and elasticity with increasing graft point functionality 3, 4, and 6 obtained from previous data. The materials compared in FIG. 14, have a relatively low number of junction points per molecule (about 4 in all cases) and thus the absolute values of strength are not particularly impressive. The trend, however, of improving mechanical robustness with increasing graft functionality is evident.

In the mechanical properties evaluation of the presently disclosed graft copolymer cylinders the strength and toughness of a range of materials (Table 1) with different graft functionalities and different numbers of branch points per molecule are compared. In addition to tensile tests at room temperature, tensile performance at elevated temperatures, as in an operating fuel cell, is evaluated. Also, dynamical mechanical, creep, and fatigue performance of these materials at room and elevated temperatures is evaluated. Also, thermogravimetric analysis (TGA) is used to investigate the chemical stability of the fluorinated and sulfonated materials at the elevated temperatures, up to 150° C., envisioned for fuel cell applications. Other TGA studies investigate the stability of these materials up to higher temperatures where degradation will likely occur. In all cases, TGA thermal stability analysis of the presently disclosed PSS-FPBD materials are compared to control experiments run on NAFION® material.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A method for forming a copolymer comprising a fluorinated polydiene and a sulfonated polystyrene, the method comprising:
   (a) providing an AB block copolymer, wherein the A block comprises a polystyrene component and the B block comprises a polydiene component;
   (b) reacting the polydiene component of the copolymer with a fluorinating agent to form a fluorinated polydiene component; and
   (c) reacting the polystyrene component of the copolymer with a sulfonating agent to form a sulfonated polystyrene component;
   thereby forming an AB block copolymer wherein the A block comprises a sulfonated polystyrene and the B block comprises a fluorinated polydiene.

2. The method of claim 1, wherein the polydiene component is selected from the group consisting of 1,4-polybutadiene, poly(1,3-cyclohexadiene), and polyisoprene.

3. The method of claim 1, wherein the fluorinating agent comprises difluorocarbene.

4. The method of claim 1, wherein the polystyrene is selected from the group consisting of polystyrene and poly(α-methylstyrene).

5. The method of claim 1, wherein the sulfonating agent is selected from the group consisting of acetyl sulfate and sulfur trioxide.

6. A method for forming a copolymer comprising a fluorinated polydiene and a sulfonated polystyrene, the method comprising:
   (a) providing an ABA triblock copolymer, wherein each of the A blocks of the triblock copolymer comprises a polydiene component and the B block of the triblock copolymer comprises a polystyrene component;
   (b) reacting the polydiene components of the copolymer with a fluorinating agent to form fluorinated polydiene components; and
   (c) reacting the polystyrene component of the copolymer with a sulfonating agent to form a sulfonated polystyrene component;
   thereby forming an ABA triblock copolymer wherein each of the A blocks comprises a fluorinated polydiene and the B block comprises a sulfonated polystyrene.

7. A method for forming a copolymer comprising a fluorinated polydiene and a sulfonated polystyrene, the method comprising:
   (a) providing a graft copolymer comprising a polydiene backbone and a plurality of grafted polystyrene side chains;
   (b) reacting the polydiene backbone of the graft copolymer with a fluorinating agent to form a fluorinated polydiene backbone; and
   (c) reacting the polystyrene side chains of the graft copolymer with a sulfonating agent to form sulfonated polystyrene side chains;
   thereby forming an graft copolymer comprising a fluorinated polydiene and a sulfonated polystyrene.

8. The method of claim 7, wherein the graft copolymer comprises an architecture, wherein the architecture is selected from the group selected from a trifunctional comb architecture, a tetrafunctional centipede architecture, a hexafunctional branch point architecture, and a miktoarm star architecture.

9. A copolymer comprising a fluorinated polydiene and a sulfonated polystyrene formed by the method of claim 1.

10. A proton exchange membrane comprising a copolymer comprising a fluorinated polydiene and a sulfonated polystyrene formed by the method of claim 1.

11. An electrochemical cell comprising the proton exchange membrane of claim 10.

12. A polyelectrolyte comprising a copolymer comprising a fluorinated polydiene and a sulfonated polystyrene formed by the method of claim 1.

13. A fabric comprising a fluorinated polydiene and a sulfonated polystyrene formed by the method of claim 1.

14. An article of chemical-biological protective clothing comprising the fabric of claim 13.

15. An article of material for protecting an agricultural product comprising the fabric of claim 13.

16. A template for sol-gel polymerization comprising a copolymer comprising a fluorinated polydiene and a sulfonated polystyrene formed by the method of claim 1.

17. The method of claim 6, wherein the polystyrene is selected from the group consisting of polystyrene and poly(α-methylstyrene).

18. A copolymer comprising a fluorinated polydiene and a sulfonated polystyrene formed by the method of claim 6.

19. A proton exchange membrane comprising a copolymer comprising a fluorinated polydiene and a sulfonated polystyrene formed by the method of claim 6.

20. An electrochemical cell comprising the proton exchange membrane of claim 19.

21. A polyelectrolyte comprising a copolymer comprising a fluorinated polydiene and a sulfonated polystyrene formed by the method of claim 6.

22. A fabric comprising a fluorinated polydiene and a sulfonated polystyrene formed by the method of claim 6.

23. An article comprising the fabric of claim 22, wherein the article comprises one of chemical-biological protective clothing or material for protecting an agricultural product.

24. A template for sol-gel polymerization comprising a copolymer comprising a fluorinated polydiene and a sulfonated polystyrene formed by the method of claim 6.

25. The method of claim 7, wherein the polystyrene is selected from the group consisting of polystyrene and poly(α-methylstyrene).

26. A copolymer comprising a fluorinated polydiene and a sulfonated polystyrene formed by the method of claim 7.

27. A proton exchange membrane comprising a copolymer comprising a fluorinated polydiene and a sulfonated polystyrene formed by the method of claim 7.

28. An electrochemical cell comprising the proton exchange membrane of claim 27.

29. A polyelectrolyte comprising a copolymer comprising a fluorinated polydiene and a sulfonated polystyrene formed by the method of claim 7.

30. A fabric comprising a fluorinated polydiene and a sulfonated polystyrene formed by the method of claim 7.

31. An article comprising the fabric of claim 30, wherein the article comprises one of chemical-biological protective clothing or material for protecting an agricultural product.

32. A template for sol-gel polymerization comprising a copolymer comprising a fluorinated polydiene and a sulfonated polystyrene formed by the method of claim 7.

* * * * *

UNITED STATES PATENT AND TRADEMARK OFFICE
CERTIFICATE OF CORRECTION

PATENT NO. : 7,619,036 B2  Page 1 of 1
APPLICATION NO. : 11/085619
DATED : November 17, 2009
INVENTOR(S) : Mays et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 337 days.

Signed and Sealed this

Twenty-sixth Day of October, 2010

David J. Kappos
*Director of the United States Patent and Trademark Office*